United States Patent [19]

Kim et al.

[11] Patent Number: 5,257,213
[45] Date of Patent: Oct. 26, 1993

[54] METHOD AND CIRCUIT FOR TWO-DIMENSIONAL DISCRETE COSINE TRANSFORM

[75] Inventors: Gye-Jong Kim, Suwon; Sang-Yook Lee; Nam-Ik Cho, both of Seoul, all of Rep. of Korea

[73] Assignee: SamSung Electronics Co., Ltd., Suwon, Rep. of Korea

[21] Appl. No.: 707,859

[22] Filed: May 30, 1991

[30] Foreign Application Priority Data

Feb. 20, 1991 [KR] Rep. of Korea ............ 1991-2721[U]

[51] Int. Cl.$^5$ .................................................. G06F 7/38
[52] U.S. Cl. ...................................................... 364/725
[58] Field of Search ........................................... 364/725

[56] References Cited

U.S. PATENT DOCUMENTS 4,385,363 5/1983 Widergren et al. ................. 364/725
4,841,464 6/1989 Guichard et al. ................... 364/725
4,849,922 7/1989 Riolfo ................................. 364/725

OTHER PUBLICATIONS

J. C. Carlach et al., "TCAD: a 27 MHz 8×8 Discrete Cosine Transform Chip," IEEE International Conference on Acoustics, Speech, and Signal Processing May 1989, pp. 2429–2432.

Primary Examiner—Long T. Nguyen
Attorney, Agent, or Firm—Robert E. Bushnell

[57] ABSTRACT

A fast parallel 2-D discrete casing transform, DCT, device capable of performing a fast 2-D DCT by significantly reducing the number of multiplications during the implementation of the 2-D DCT. N×N 2-D input data is re-arranged into N groups so as to be the same as the kernel of a cosine function in order to transform a multiplying form of the cosine function (as the kernel of a 2-D DCT) into a summation form. Then, the first summations and first subtractions are carried out on the re-arranged data, thereby generating first computed data. Then, N 1-D DCT's are carried out on the first computed data. Finally, the 2-D DCT data is generated by carrying out a shifting process after performing additions and subtractions on the 1-D DCT data in $\log_2 N$ stages.

25 Claims, 13 Drawing Sheets

METHOD AND CIRCUIT FOR TWO-DIMENSIONAL DISCRETE COSINE TRANSFORM

FIELD OF THE INVENTION

The present invention relates to a two-dimensional discrete cosine transform (to be called hereinafter 2-D DCT) for use in a data transmission system, in which the computing time period of the 2-D DCT can be shortened, thereby achieving a fast 2-D DCT.

BACKGROUND OF THE INVENTION

Generally, in data communication, data to be transmitted is compressed at a transmitter and then the compressed data is converted into an original data format at a receiver. Such compressed data is subject to the transform and, for this end, the most widely known method is called the 2-D DCT. For instance, for a given 2-D data sequence $[X_{ij}: i, j=0, 1, 2, \ldots, N-1]$, the 2-D DCT sequence $[Y_{mn}: m, n=0, 1, 2, \ldots, N-1]$ is given by $$Y_{mn} = \frac{4}{N^2} U(m) U(n) \sum_{i=0}^{N-1} \sum_{j=0}^{N-1} X_{ij} \cos \frac{(2i+1)m}{2N} \pi \cos \frac{(2j+1)n}{2N} \pi \quad (1')$$

where a scale factor $$\frac{4}{N^2} U(m) U(n)$$

may be neglected for convenience. Then, a denormalized 2-D DCT form $y_{mn}$ of the 2-D DCT sequence is defined as $$Y_{mn} = \frac{4}{N^2} U(m) U(n) y_{mn} \quad (3')$$

Accordingly, it is noted from the above Formula (2') that the denormalized 2-D DCT sequence $y_{mn}$ is expressed in terms of N 1-D DCT's by implementing $$y_{mn} = \sum_{i=0}^{N-1} \sum_{j=0}^{N-1} X_{ij} \cos \frac{(2i+1)m}{2N} \pi \cos \frac{(2j+1)n}{2N} \pi \quad (2')$$

in the row direction, and thereafter implementing $$\sum_{i=0}^{N-1} \cos \frac{(2i+1)m}{2N} \pi$$

in the column direction.

That is, from Formula (2'), the 2-D DCT can be expressed by Formula (3') as shown below.

$$\sum_{j=0}^{N-1} \cos \frac{(2j+1)n}{2N} \pi$$

Therefore, in order to implement a DCT for a N×N 2-D digital data based on Formulas (2') and (3'), a system constituted as illustrated in FIG. 1 may be used. That is, 1-D DCT are implemented N times in the row direction for the N×N 2-D digital data input, and the resulting outputs therefrom are then transposed in the form of a matrix by a matrix transposer 2. Then, the resulting outputs of the matrix transposer 2 are subject to N 1-D DCT's in the column directions, thereby obtaining the resulting 2-D DCT output $Y_{mn}$.

However, in the case where a 2-D DCT is implemented for N×N 2-D digital data in the above described method, the DCT computing time is delayed due to the implementation of 2N 1-D DCT's, and at the same time, the hardware construction therefor becomes complicated, thereby making it difficult to realize a high density VLSI. That is, a 1-D DCT circuit is generally comprised of a number of adders and multipliers; however, using the large number of 1-D DCT's included in a circuit implies that a great number of multipliers must be used. It is therefore understood from the foregoing that if a 2-D DCT circuit includes a large number of 1-D DCT's, the computing time is increased and the construction of the hardware becomes complicated. Furthermore, since the input digital data is subject to the 1-D DCT in the row direction, the output thereof being transposed in the form of the matrix so as to perform 1-D DCT for the transposed data in the column direction, there are great difficulties in constituting the matrix transposer in the form of hardware.

However, in order to perform the real time data compression for a great amount of data, a fast DCT scheme is necessarily required. Preferably, a scheme such as a parallel structure with a fast transform speed and low complexity, is required. In attempts to overcome the above described problems which are inherent in the method of FIG. 1, various methods have been proposed. A variety of examples are disclosed in "A TWO-DIMENSIONAL FAST COSINE TRANSFORM" by M. A. Hague [IEEE Trans. Acoust., Speech, Signal processing, Vol. ASSP-33, PP. 1532–1539, Dec. 1985.], and "A FAST RECURSIVE TWO-DIMENSIONAL COSINE TRANSFORM" by C. Ma [Intelligent Robots and Computer Vision: Seventh in a series, David P. Casasent, Editor, Proc. SPIE 1002, PP. 541–548, 1988].

In the above publications, there are proposed several ways to carry out the 2-D DCT, without using the 1-D DCT. Thus, if the 2-D DCT is performed in the above method, a separate hardware is required regardless of the 1-D DCT circuit. Furthermore, for the implementation of the DCT, the number of multiplications is reduced by about 25 percent, compared with the conventional methods. Nevertheless, the DCT computing time is still long, causing a problem in implementing the fast DCT.

SUMMARY OF THE INVENTION

Therefore it is an object of the present invention to provide a method and device for a fast 2-D DCT in which the 2-D DCT for N×N digital data input is performed in terms of N 1-D DCT's by adding and shifting the data.

It is another object of the present invention to provide a method and device for a fast 2-D DCT in which the number of multiplications is reduced, by converting a multiplication form of cosine function into an summation form thereof so as to perform the 2-D DCT by means of summation of a 1-D DCT.

It is still another object of the present invention to provide a method and device for a fast 2-D DCT in which the multiplication form of a cosine function is re-arranged into a summation form thereof, the re-arranged digital data is subject to a primary addition process, N 1-D DCT's are performed for the result of the primary addition, and then, the result is subject to a secondary addition process.

It is still another object of the present invention to provide a method and device for re-arranging N×N digital data into N groups of data so as to carry out the 2-D DCT by means of performing N 1-D DCT's.

It is still another object of the present invention to provide a method and device for a fast 2-D DCT in which, N/2 odd numbered groups of data and N/2 even numbered groups of data from the re-arranged N group data are subject to a primary addition and subtraction, 1-D DCT is performed for the result, and the resultant value of the 1-D DCT is subject to a secondary summation and subtraction for $\log_2 N$ stages.

It is still another object of the present invention to provide a method and device for reducing the number of the implementations of the 1-D DCT to N/2 times in an N×N 2-D DCT circuit, in which during a primary addition of N/2 groups of data from the N group data re-arranged in a circuit which implements 1-D DCT in a pipe line structure, the remaining N/2 groups of data are subject to a 1-D DCT, and during the 1-D DCT implementation for the primary addition of N/2 groups of data, a secondary summation of the remaining N/2 groups of data is implemented.

According to an aspect of the present invention, a device for carrying out fast discrete cosine transforms on N×N two-dimensional input data, includes: a circuit for re-arranging the N×N input data to be identical to kernel of one-dimensional discrete cosine transform of a cosine function so as to transform a multiplying form of the cosine function, the multiplying form being the kernel of a two-dimensional discrete cosine transform into an summation form; a circuit for generating first N/2 summed data by adding together the respective re-arranged data of even groups and odd groups among the re-arranged data, and generating first N/2 subtracted data by subtracting one from the other of remaining data groups; a circuit for carrying out one-dimensional discrete cosine transforms on the first added data and the first subtracted data produced through the first computing step; and a circuit coupled to the one-dimensional discrete cosine transform circuit, for generating two-dimensional discrete cosine transform data by performing summations and subtractions on the one-dimensional discrete cosine transform outputs in $\log_2 N$ butterfly stages, and then by shifting the result of the summation and subtraction by multiplying by $\frac{1}{2}$.

BRIEF DESCRIPTION OF THE DRAWINGS

The above objects and other advantages of the present invention will become more apparent by describing in detail the preferred embodiment of the present invention with reference to the attached drawings, in which.

DESCRIPTION OF THE PREFERRED EMBODIMENT

Figure 2A:
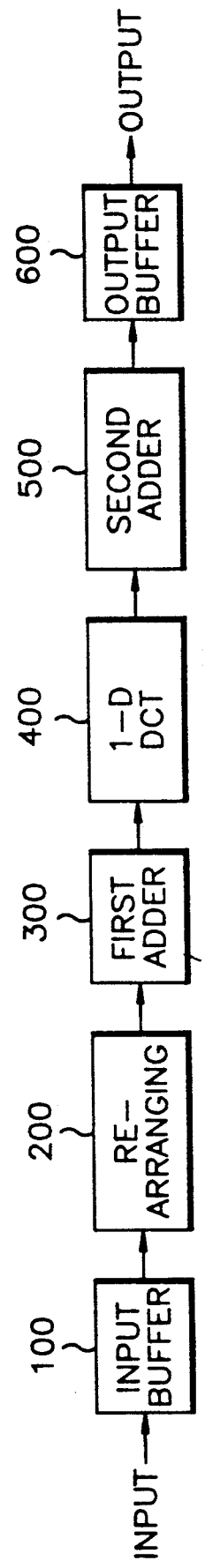
FIGS. 2A and 2B illustrate a 2-D DCT circuit and an inverse 2-D DCT circuit, respectively, according to the present invention.

Referring to FIG. 2A, an input buffer 100 receives N×N 2-D digital data input and a re-arranging section 200 receives the data output from the input buffer 100. In order to transform the multiplication of cosine function which is the kernel of 2-D DCT, into the summation of the cosine function, the re-arranging section 200 re-arranges the data input into N groups of data so that the summation of cosine function may be the same as the kernel of 1-D DCT. A first adder 300 receives the output of the re-arranging section 200 to generate summation data as well as subtraction data for N/2 groups of data by adding or subtracting the data of the respective odd numbered groups of data to or from the data of the adjacent even numbered groups of the re-arranged N groups of data. Then, the summation data and subtraction data of N/2 groups are applied to a 1-D DCT section 400 which implements 1-D DCT to generate 1-D DCT data with respect to the summation data and subtraction data of N/2 groups of data. A second adder 500 receives the output of the 1-D DCT section 400 to generate 2-D DCT data by carrying out summation, subtraction and shifting operations for $\log_2 N$ stages. Furthermore, an output buffer 600 buffers the output of the second adding section 500.

In addition, a 2-D inverse DCT (hereinafter referred to as 2-D IDCT) shown in FIG. 2B has a construction which is inverse, in operation, of the 2-D DCT circuit of FIG. 2A.

Figures 3A, 3B:
FIGS. 3A and 3B illustrate re-arranged data format for an 8×8 input data of FIG. 2.

Referring to FIGS. 3A and 3B, there is shown the procedure of re-arranging 8×8 input data into eight groups of data. After receipt of the 8×8 input data as shown in FIG. 3A, the data is re-arranged into 8 groups to have the summation of the cosine function become the same as the kernel of 1-D DCT, so that the multiplication of cosine function which is the kernel of 2-D DCT may be transformed to the summation of the cosine function.

Figure 4A:
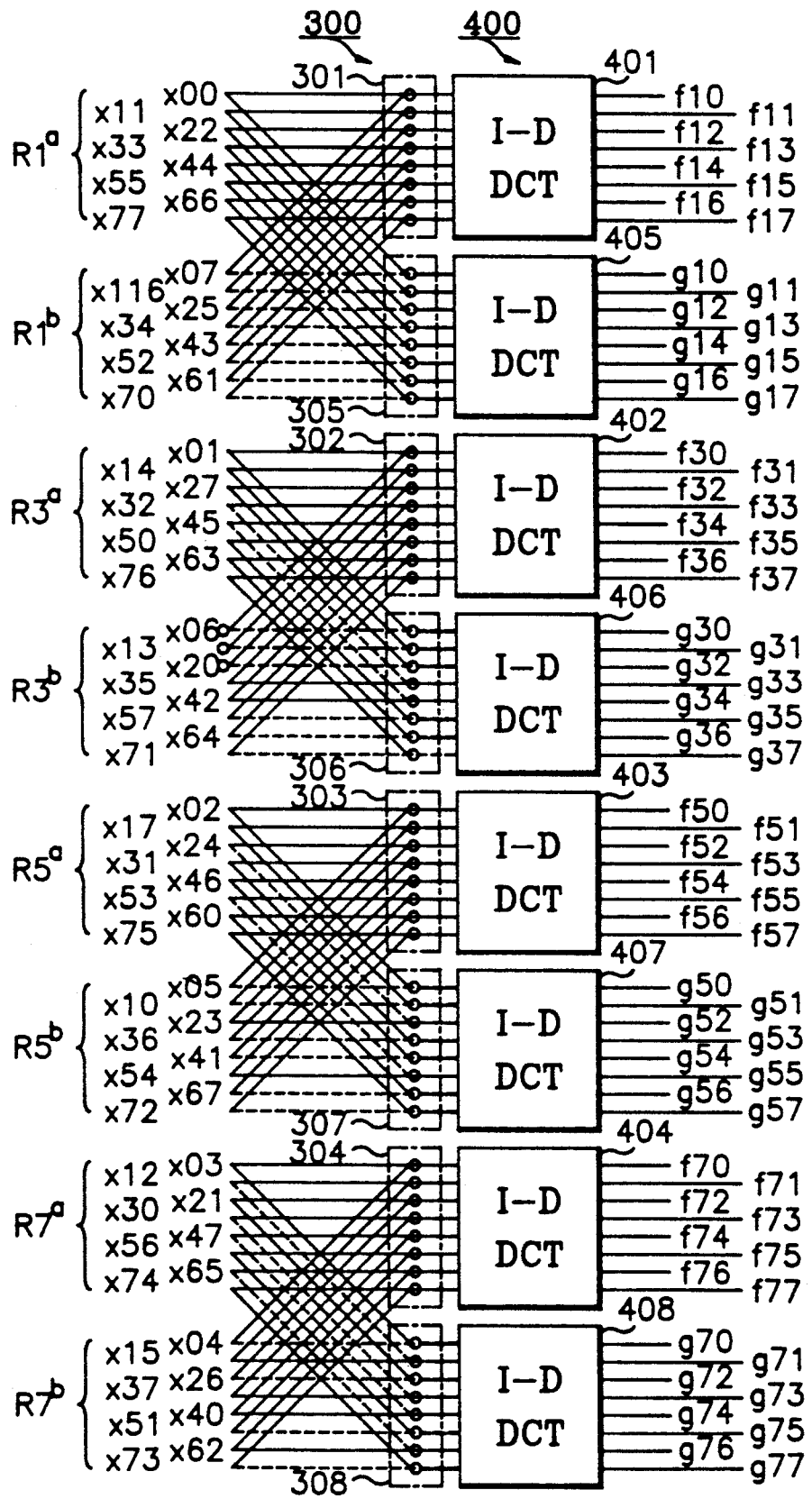
FIGS. 4A, 4B, 4C illustrate a first embodiment of an 8×8 2-D DCT circuit according to the present invention.
Figure 4B:
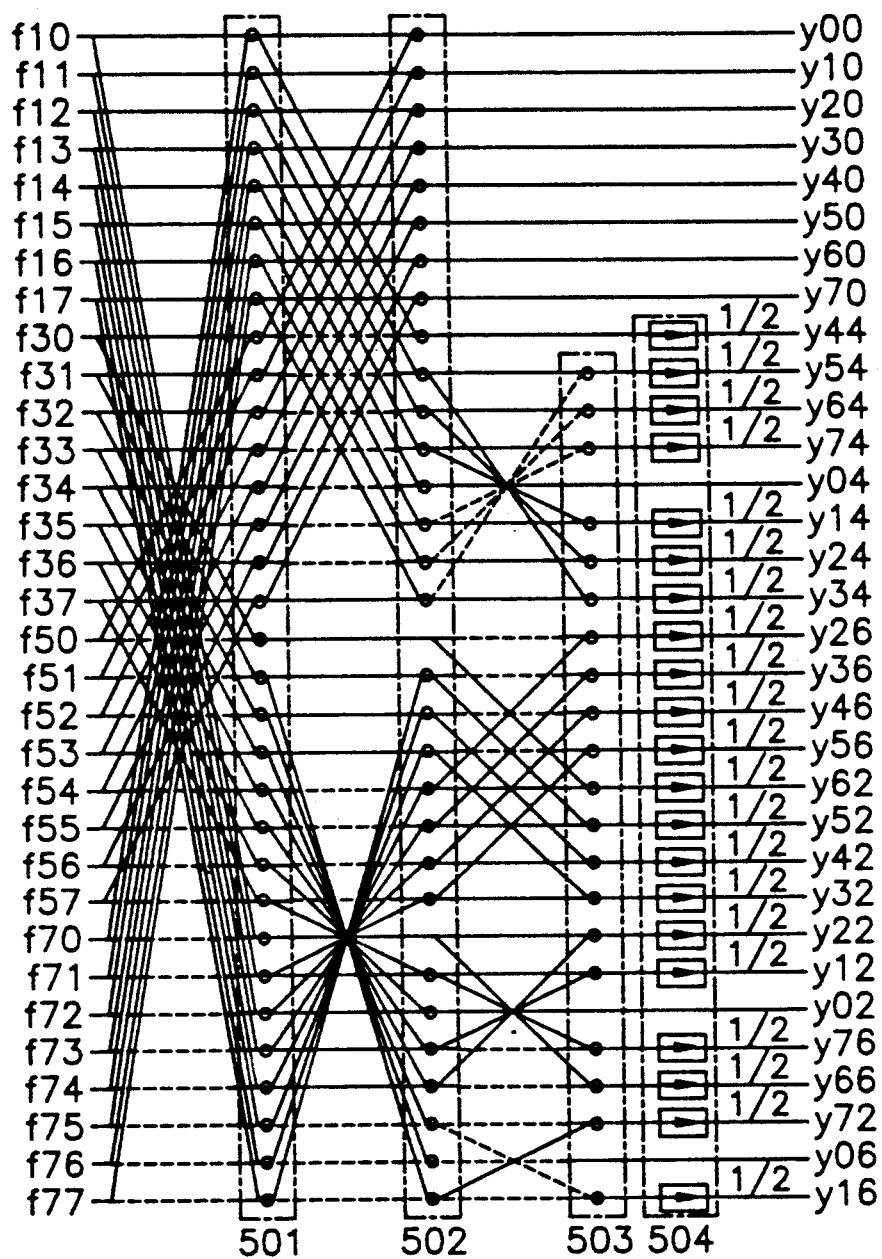
Figure 4C:
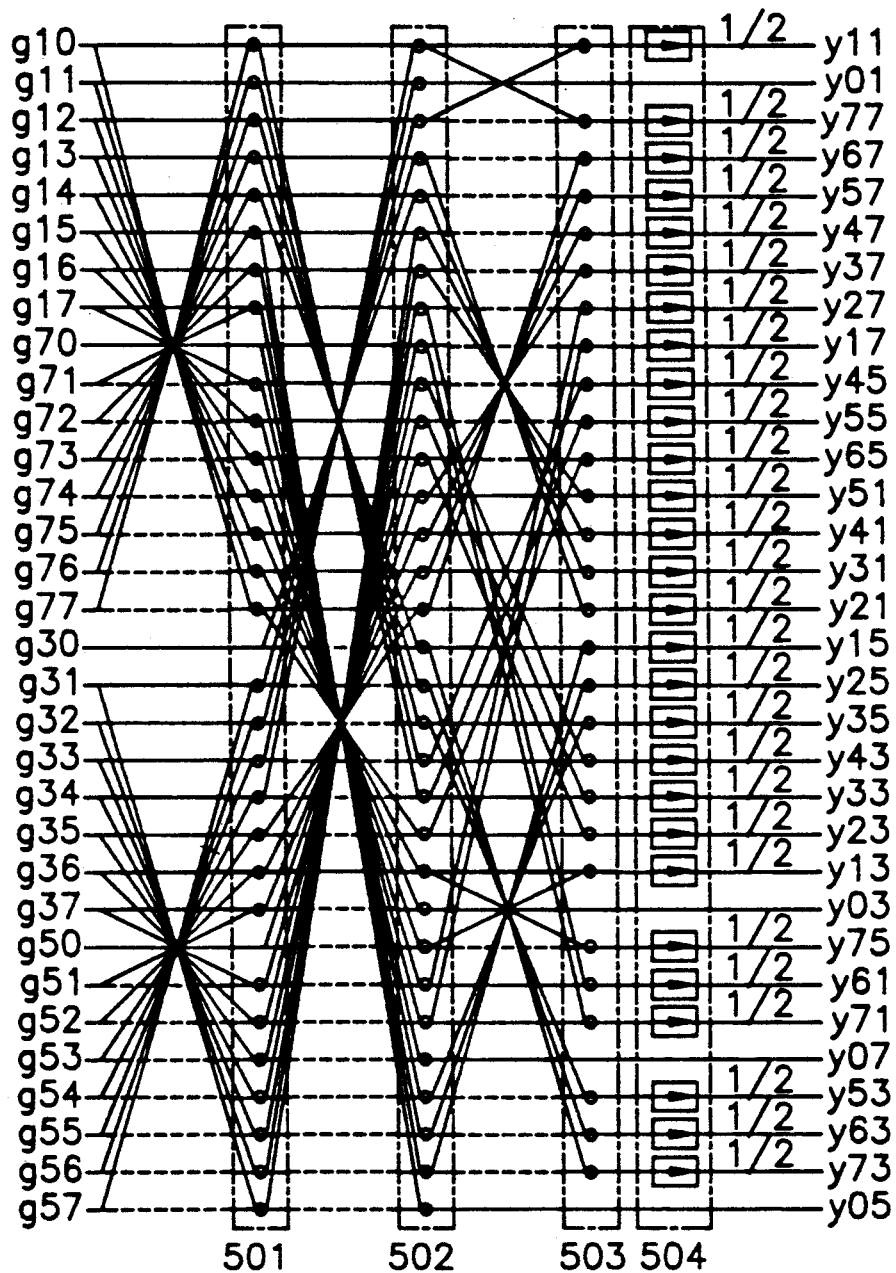

In FIGS. 4A to 4C, an embodiment of an 8×8 DCT is shown in which a first adder 300 (i.e., the adders 301–308) receiving the re-arranged 8 group data sets adds or subtracts a data set of group $R_1^a$, $R_3^a$, $R_5^a$, $R_7^a$ to or from another data set of an adjacent group $R_1^b$, $R_3^b$, $R_5^b$, $R_7^b$ to generate therefrom the summation data and subtraction data of the two groups. The 1-D DCT section 400 (i.e., the sections 401–408) receiving the output of the first adder 300 carries out 1-D DCT for the eight groups of the data sets with respect to the summation and subtraction data. Further, the second adder 500 receiving the DCT data from the 1-D DCT section 400 carries out summation, shift operation and subtraction for $\log_2 N$ stages to generate 2-D DCT data.

In FIGS. 4A to 4C, "○" indicates an adder, dotted lines indicates transfer factors "−1", solid lines indicates unit transfer factors, and '⇒' with $\frac{1}{2}$ indicates multiplication by $\frac{1}{2}$ which is equivalent to shift operation. FIG. 4A illustrates a process for which, among the re-arranged eight groups of data sets $X_{ij}$, odd numbered groups and the adjacent groups of data sets are added or subtracted to or from each other, and 1-D DCT's are carried out for the summation and subtraction data, thereby to generate summation group data $f_{pl}$ and subtraction group data $g_{pl}$.

FIG. 4B illustrates a process for which a secondary summation is performed on the summation group data $f_{pl}$, and 2-D DCT data $y_{mn}$ is generated. FIG. 4C illustrates a process for which a secondary summation is performed on the subtracted group data $g_{pi}$, and 2-D DCT data $y_{mn}$ is generated.

Figure 5A:
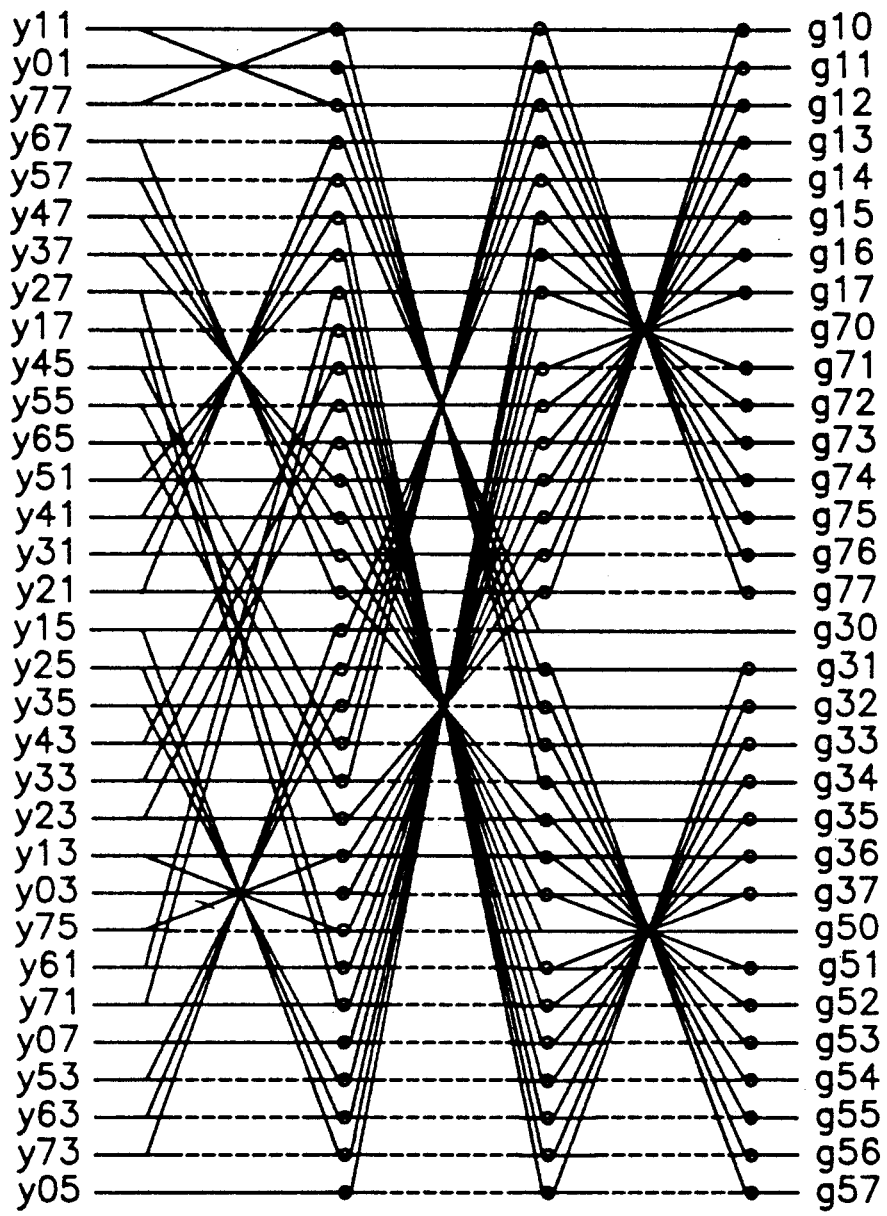
FIGS. 5A, 5B, 5C illustrate the constitution of an 8×8 inverse 2-D DCT circuit according to the present invention.
Figure 5B:
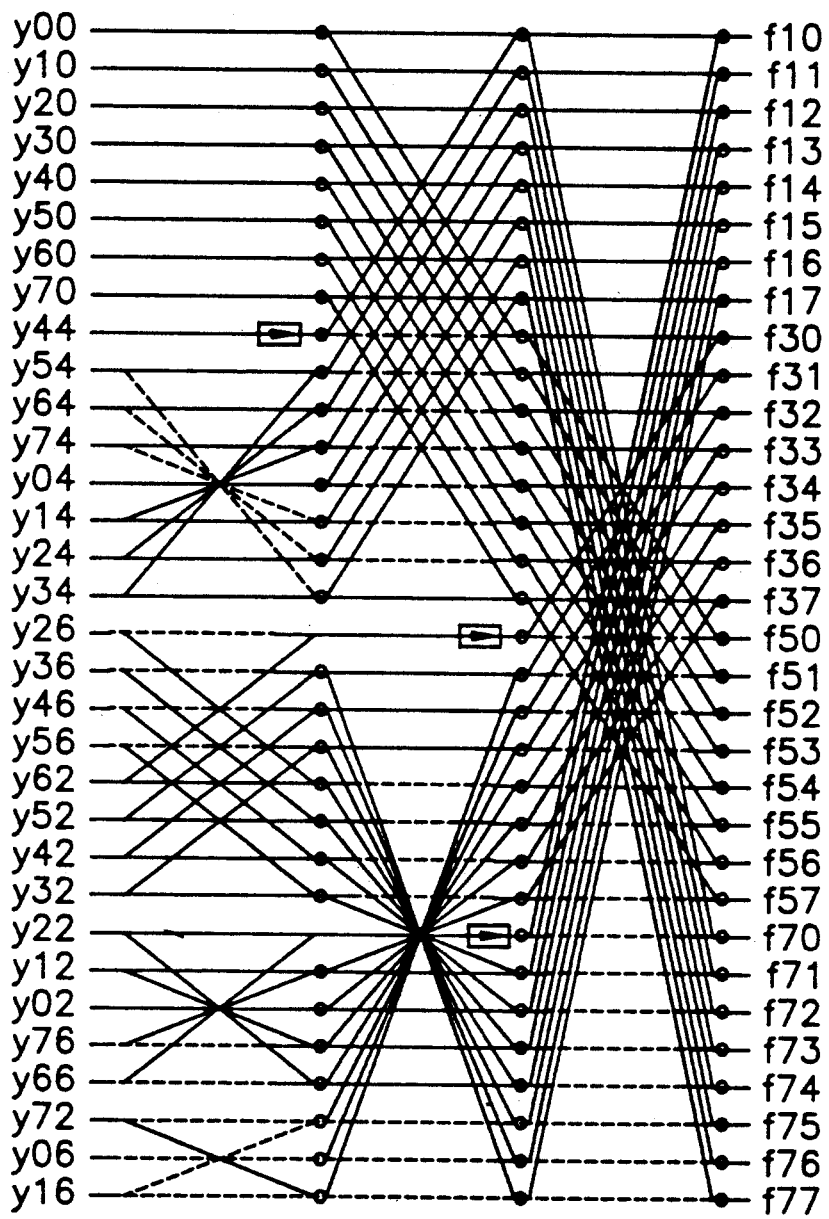
Figure 5C:
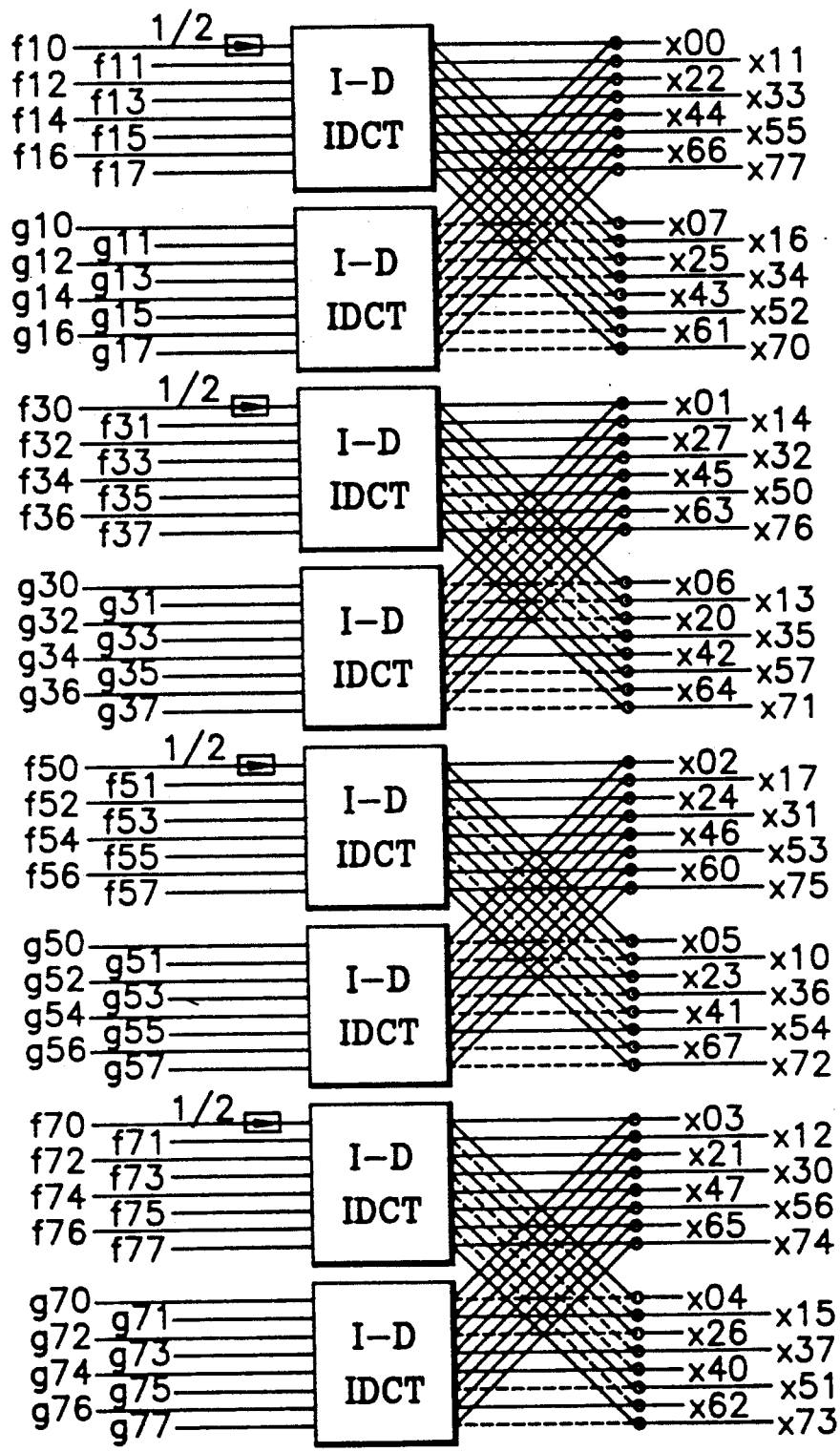

FIGS. 5A to 5C illustrating an 8×8 IDCT, shows a process inverse to that of the 8×8 DCT of FIGS. 4A to 4C.

Figure 1:
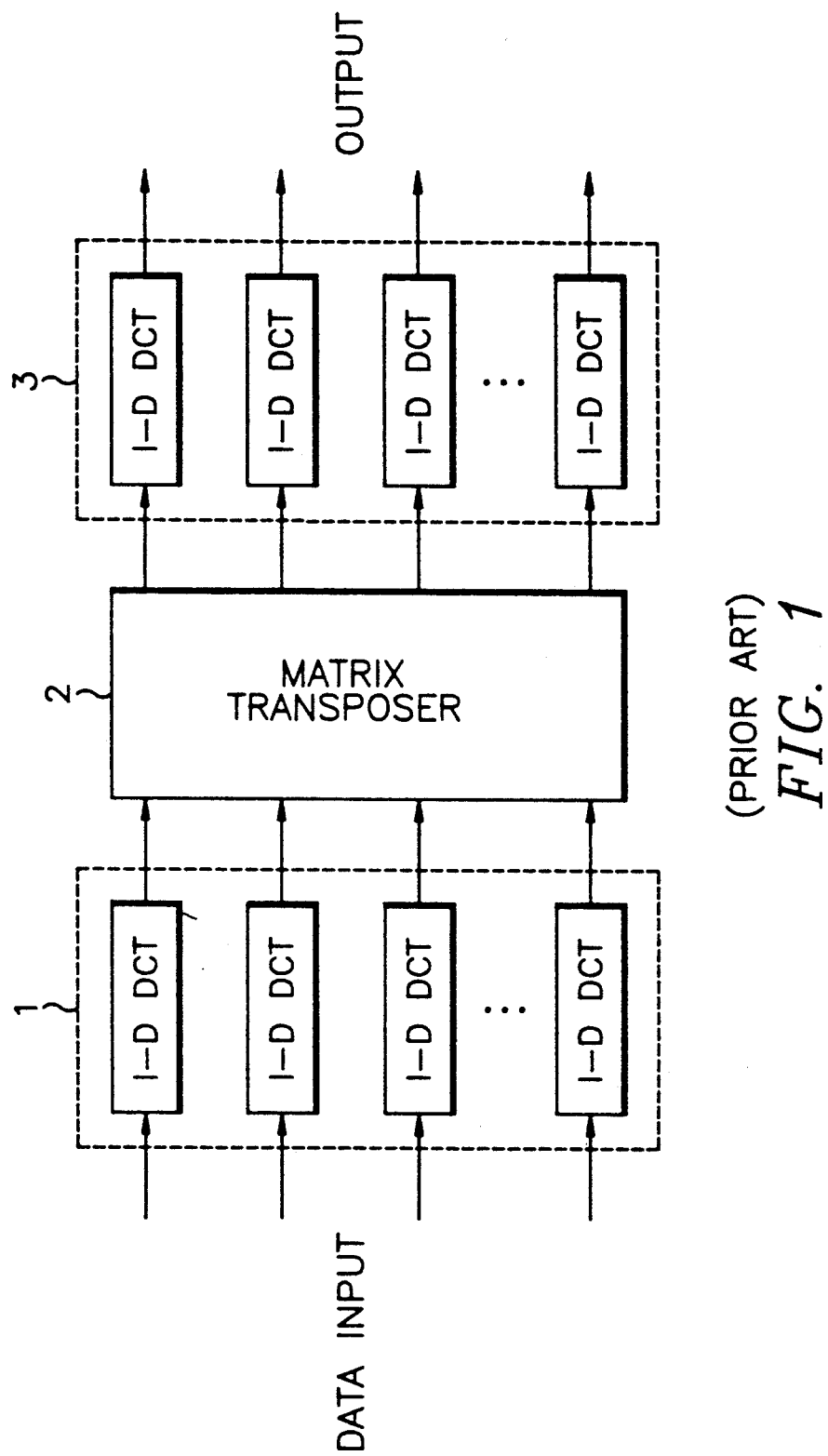
FIG. 1 illustrates the constitution of a conventional 2-D DCT circuit.
Figure 6:
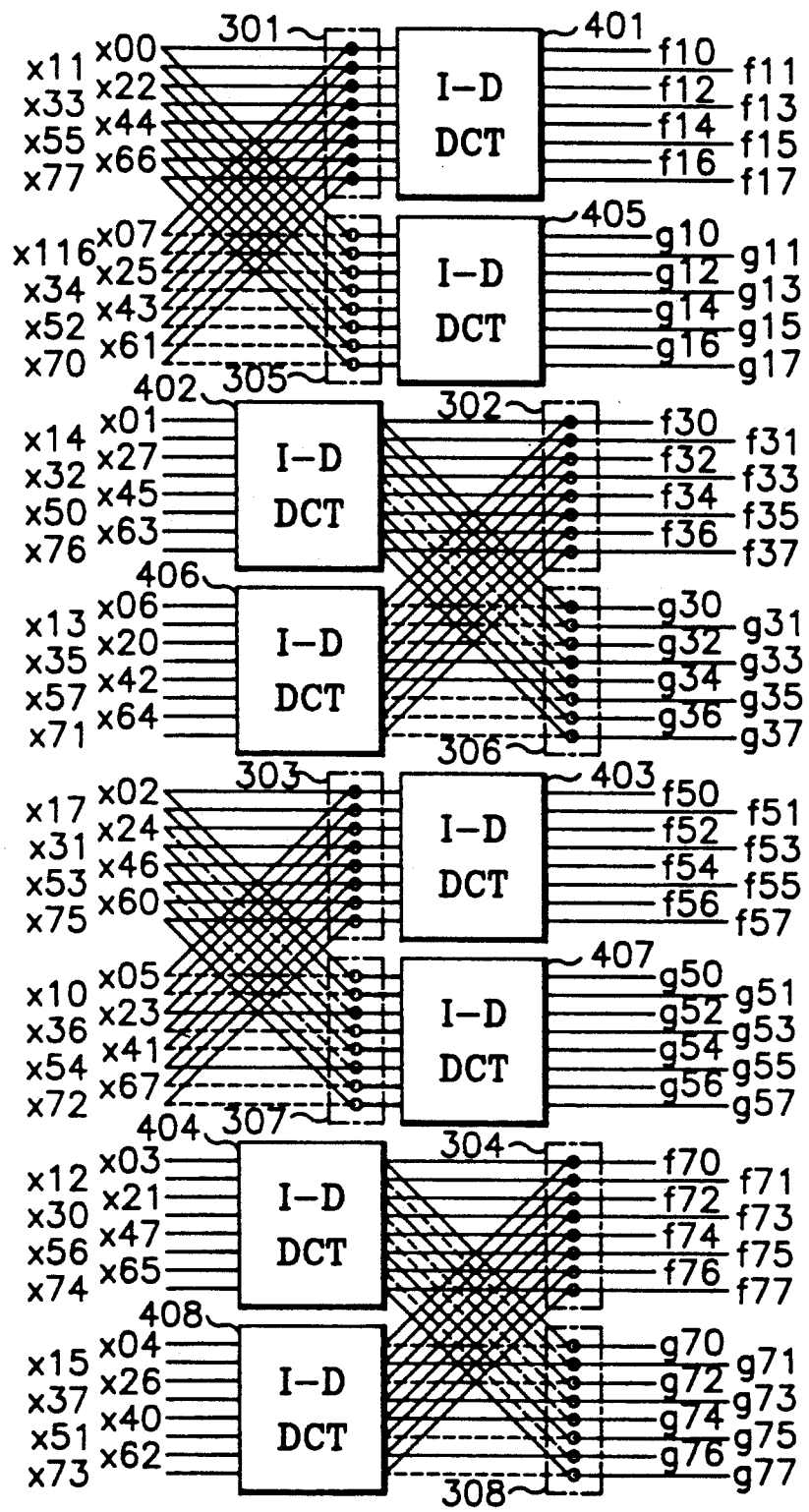
FIG. 6 illustrates another embodiment of the first adder and the 1-D DCT circuit of FIGS. 2A and 2B.

Referring to FIG. 6, it illustrates another constitution of the first adder 300 and the 1-D DCT section 400 of FIG. 1 and shows the fact that, even if the primary summation operation is performed after subjecting the 2-D data input to 1-D DCT's, it is equivalent to the operation that 1-D DCT's are carried out after performing a primary summation.

FIG. 7 illustrates another embodiment of the 8×8 DCT, and according to this drawing, the constitution of the 1-D DCT section 400 is reduced in its complexity by ½ by using multiplexers 701, 702 and demultiplexers 801, 802.

The present invention will now be described hereinbelow in detail as to its operations, with reference to the above described constitutions.

According to the present invention, an N×N 2-D DCT is carried out by implementing 1-D DCT N times, so that the number of multiplications may be greatly decreased and the 2-D DCT may be performed at a high speed, improving the regularity and allowing the system to achieve a high density.

For this end, the multiplication of row and column cosine functions of 2-D DCT kernel should be transformed to the summation of the cosine functions. Further, the transformed data sets should be re-arranged into N 1-D DCT groups of data sets, so that the data sets may become equivalent to 1-D DCT kernel. Accordingly, when the re-arranging section 200 which receives N×N 2-D digital data input, transforms the multiplication of the cosine functions which is the kernel of the 2-D DCT into the summation of cosine functions, the input data sets must be rearranged into N groups so that the summation of the cosine functions may become equivalent to the kernel of the 1-D DCT.

Thereafter, each of the re-arranged N groups of data sets will have a unique characteristics and, according to the characteristics, the first adder 300 performs the summation or subtraction on the respective groups. Thus, the first adder 300 receives N groups of the data sets to perform the summation and subtraction and, in performing the computations, two data sets are added together for N/2 groups of the data sets. Whereas, a data set is subtracted from another data set for the remaining N/2 groups of the data sets. Therefore, the resultant data output from the first adder 300 consists of the summation data for the first N/2 groups and the subtraction data for the remaining N/2 groups.

The summation and subtraction data which are output from the first adder 300 are then respectively transformed to DCT data by the 1-D DCT section 400, while the output of the 1-D DCT section 400 is subject to subtraction for $\log_2 N$ stages and shifted by the second adder 500, thereby generating 2-D DCT data $y_{mn}$. Therefore, among the ultimately obtained 2-D DCT data $y_{mn}$, the 2-D DCT data having an even numbered "n" are the summation of the results which are obtained by carrying out the 1-D DCT in the form of adding the both data sets through all of them by the first adding section 300, while those having an odd numbered "n" are the summation of the results which are obtained by carrying out the 1-D DCT in the form of subtracting one data set from another data set by the first adding section 300.

Now a process for carrying out the N×N 2-D DCT in the above method will be described in more detail below. Assuming that the 2-D data sequence are represented by $[X_{ij}: i, j=0, 1, \ldots, N-1]$ and that the 2-D DCT sequence are represented by $[Y_{mn}: m, n=0, 1, \ldots, N-1]$, then the relation therebetween can be expressed by Formula (1) as shown below.

$$Y_{mn} = \frac{4}{N^2} U(m) U(n) \sum_{i=0}^{N-1} \sum_{j=0}^{N-1} X_{ij} \cos\frac{(2i+1)m}{2N}\pi \cos\frac{(2j+1)n}{2N}\pi \quad (1)$$

In Formula (1), the scale factor $$\frac{4}{N^2} U(m) U(n)$$

can be neglected and thus, a denormalized DCT form of $Y_{mn}$ is defined as $$y_{mn} = \sum_{i=0}^{N-1} \sum_{j=0}^{N-1} X_{ij} \cos\frac{(2i+1)m}{2N}\pi \cos\frac{(2j+1)n}{2N}\pi \quad (2)$$

Therefore, the normalized DCT $Y_{mn}$ can be expressed as shown below, $$Y_{mn} = \frac{4}{N^2} U(m) U(n) \cdot y_{mn} \quad (3)$$

In this case, the multiplication in terms of the cosine functions of the 2-D DCT kernel can be expressed in a summation in terms of the cosine functions as shown in Formula (4) below.

$$\cos\frac{(2i+1)m}{2N}\pi \cos\frac{(2j+1)n}{2N}\pi = \quad (4)$$

$$\frac{1}{2}\left(\cos\frac{(2i+1)m + (2j+1)n}{2N}\pi + \right.$$

$$\left.\cos\frac{(2i+1)m - (2j+1)n}{2N}\pi\right)$$

From Formula (4), the 2-D DCT $Y_{mn}$ of Formula (2) can be expressed as shown in the following Formula (5).

$$y_{mn} = \frac{1}{2}\left(\sum_{i=0}^{N-1} \sum_{j=0}^{N-1} X_{ij} \cos\frac{(2i+1)m + (2j+1)n}{2N}\pi + \right. \quad (5)$$

$$\sum_{i=0}^{N-1} \sum_{j=0}^{N-1} X_{ij} \cos \frac{(2i+1)m - (2j+1)n}{2N} \pi \bigg)$$

where m, n=0, 1, 2, ..., N−1.

For convenience, the 2-D DCT can be divided into 1-D DCT's $A_{mn}$ and $B_{mn}$ based on the cosine summation theorem, as shown below in Formulas (6) and (7).

$$A_{mn} = \sum_{i=0}^{N-1} \sum_{j=0}^{N-1} X_{ij} \cos \frac{(2i+1)m + (2j+1)n}{2N} \pi \quad (6)$$

$$B_{mn} = \sum_{i=0}^{N-1} \sum_{j=0}^{N-1} X_{ij} \cos \frac{(2i+1)m - (2j+1)n}{2N} \pi \quad (7)$$

Therefore, $Y_{mn}$ which is the result of the 2-D DCT can be expressed by Formula (8) as below, $$y_{mn} = \tfrac{1}{2}(A_{mn} + B_{mn}) \quad (8)$$

Now the possibility that an N×N DCT can be implemented by carrying out N independent 1-D DCT will be presented by showing that $y_{mn}$ can be represented by the summation of N 1-D DCT's through a slight data re-arrangement of $A_{mn}$ and $B_{mn}$. If the transform kernels of the Formulas (6) and (7) are made to be equal to the kernels of the 1-D DCT, it is necessary that $[(2i+1)m \pm (2j+1)n]$ be expressed in the form of $(2i+1)$ times an integer. If this condition is to be satisfied, the remainder remaining after dividing $(2j+1)$ by 2N should be equal either to the remainder remaining after dividing a multiplication of $(2i+1)$ by 2N, or the remainder remaining after dividing 2N minus a multiplication of $(2i+1)$ by 2N. That is, the above relation should satisfy Formulas (9) and (10) shown below.

$$(2j+1) = p(2i+1) \text{ modulo } 2N \quad (9)$$

$$(2j+1) = p(2i+1) + N \text{ modulo } 2N \quad (10)$$

where, p is an odd integer ranging between 1 and N−1. Therefore, Formulas (9) and (10) can be expressed by Formulas (11) and (12) as shown below, $$j = pi + \frac{p-1}{2} \text{ modulo } N \quad (11)$$

$$j = N - 1 - pi - \frac{p-1}{2} \text{ modulo } N \quad (12)$$

where p=1, 3, 5, ..., N−1.

In the above, when the variable i varies from 0 to N−1, the sequences for the variable j which are respectively determined by Formulas (9) and (10) are different from each other. Accordingly, the N×N 2-D data can be separated into N different data groups which satisfy Formulas (9) and (10). Then, the transform kernels of Formula (5) for the respective data groups become equal to the kernels of the 1-D DCT. Therefore, in order to distinguish between the respective j sequences produced by Formulas (11) and (12) for p=1, 3, 5, ..., N−1, Formulas (13) and (14) are defined as shown below.

$$j(p;a) = pi + \frac{p-1}{2} \text{ modulo } N \quad (13)$$

$$j(p;b) = (N-1) - pi - \frac{p-1}{2} \text{ modulo } N \quad (14)$$

where p=1, 3, 5, ... N−1, and i=0, 1, 2, 3, ..., N−1. That is, for a given p, [j(p;a):i=0, 1, 2, ..., N−1] is a j sequence produced by Formula (9), while [j(p;b):i=0, 1, 2, ..., N−1] is a j sequence produced by Formula (10). Accordingly, the 2-D input data and [$X_{ij}$: i, j=0, 1, 2, ..., N−1] can be separated into N separate 1-D data in the form of [$X_{ij(p;a)}$: i=0, 1, 2, ..., N−1] and [$X_{ij(p;b)}$: i=0, 1, 2, ..., N−1], so that Formula (5) can be expressed in the terms of the summation of the 1-D DCT. In this case, if the groups of the 1-D data are respectively represented by $R_p^a$ and $R_p^b$, Formulas (15) and (16) can be defined as follows.

$$R_p^a = \left[ X_{ij(p;a)}: i = 0, 1, 2, \ldots, N-1, j(p;a) = pi + \frac{p-1}{2} \text{ modulo } N \right] \quad (15)$$

$$R_p^b = \left[ X_{ij(p;b)}: i = 0, 1, 2, \ldots, N-1, j(p;b) = N - 1 - pi - \frac{p-1}{2} \text{ modulo } N \right] \quad (16)$$

The exact value obtained by dividing $$pi + \frac{p-1}{2}$$

by N should be known from the above, however, only the remainders of the dividing can be known from Formulas (15) and (16). That is, the product of the dividing and the remainder of carrying out the dividing should both be known. Therefore, if a new integer sequence $q_{pi}$ for representing the product of dividing $$pi + \frac{p-1}{2}$$

by N is to be defined, "modulo" can be omitted from Formulas (15) and (16) as shown in Formulas (17) and (18).

$$R_p^a = \left[ X_{ij(p;a)}: i = 0, 1, 2, \ldots, N-1, j(p;a) = pi + \frac{p-1}{2} Nq_{pi} \right] \quad (17)$$

$$R_p^b = \left[ X_{ij(p;b)}: i = 0, 1, 2, \ldots, N-1, j(p;b) = N - 1 - pi - \frac{p-1}{2} + Nq_{pi} \right] \quad (18)$$

where p=1, 3, 5, ..., N−1.

If the data re-arrangements are applied to Formulas (17) and (18), then $A_{mn}$ and $B_{mn}$ which are expressed by Formulas (7) and (8) can be expressed Formulas (19) n below.

$$A_{mn} = \sum_{p=1}^{N-1} [T_p^a(m,n) + T_p^b(m,n)] \quad (19)$$

$$B_{mn} = \sum_{p=1}^{N-1} [S_p^a(m,n) + S_p^b(m,n)] \quad (20)$$

where p is an odd integer.

Furthermore, $T_p^a(m,n)$, $T_p^b(m,n)$, $S_p^a(m,n)$ and $S_p^b(m,n)$ can be expressed by Formulas (21)–(24) as shown below.

$$T_p^a(m,n) = \sum_{X_{ij} \in R_p^a} X_{ij} \cos \frac{(2i+1)m + (2j+1)n}{2N} \pi \quad (21)$$

$$T_p^b(m,n) = \sum_{X_{ij} \in R_p^b} X_{ij} \cos \frac{(2i+1)m + (2j+1)n}{2N} \pi \quad (22)$$

$$S_p^a(m,n) = \sum_{X_{ij} \in R_p^a} X_{ij} \cos \frac{(2i+1)m - (2j+1)n}{2N} \pi \quad (23)$$

$$S_p^b(m,m) = \sum_{X_{ij} \in R_p^b} X_{ij} \cos \frac{(2i+1)m - (2j+1)n}{2N} \pi \quad (24)$$

Accordingly, $y_{mn}$ of Formula (8) can be rewritten as:

$$y_{mn} = \sum_{p=1}^{N-1} [T_p^a(m,n) + T_p^b(m,n) + S_p^a(m,n) + S_p^b(m,n)] \quad (25)$$

Thus, in order to show that $y_{mn}$ is the summation of 1-D DCT's, it has only to show that $T_p^a(m,n)$, $T_p^b(m,n)$, $S_p^a(m,n)$ and $S_p^b(m,n)$ can be expressed in terms of summation of 1-DCT's. For this end, Formula (17) can be substituted for a corresponding term in Formula (21) to obtain Formula (26) as shown below.

$$T_p^a(m,n) = \sum_{i=}^{N-1} X_{ijpa} \frac{i + m + Pi + -Nq_{pi}n}{N} \quad (26)$$

Formula (29) can be separated into Formulas (27) and (28) for the cases where n is even and odd integers as shown below.

$$T_p^a(m,n) = \sum_{i=0}^{N-1} X_{ij(p;a)} \cos \frac{(2i+1)(m+Pn)}{2N} \pi \quad (27)$$

where n is even integer.

$$T_p^a(m,n) = \sum_{i=0}^{N-1} (-1)^{q_{pi}} X_{ij(p;a)} \cos \frac{(2i+1)(m+Pn)}{2N} \pi \quad (28)$$

where n is odd integer.

Further, Formula (22) can be substituted for a corresponding term in Formula (8) to obtain Formula (29) as shown below.

$$T_p^b(m,n) = \sum_{i=0}^{N-1} X_{ij(p;b)} \cos \frac{(2i+1)(m-nP) + 2N(1+q_{pi})n}{2N} \pi \quad (29)$$

However, Formula (29) can be separated into Formulas (30) and (31) depending on whether n is odd or even integer.

$$T_p^b(m,n) = \sum_{i=0}^{N-1} X_{ij(p;b)} \cos \frac{(2i+1)(m-Pn)}{2N} \pi \quad (30)$$

where n is even integer.

$$T_p^b(m,n) = -\sum_{i=0}^{N-1} (-1)^{q_{pi}} X_{ij(p;b)} \cos \frac{(2i+1)(m-nP)}{2N} \pi \quad (31)$$

where n is odd integer.

In the same way, if Formula (23) is substituted for a corresponding term in Formula (7), $S_p^a(m,n)$ can be expressed by Formulas (32) and (33) as shown below.

$$S_p^a(m,n) = \sum_{i=0}^{N-1} X_{ij(p;a)} \cos \frac{(2i+1)(m-Pn)}{2N} \pi \quad (32)$$

where n is even integer.

$$S_p^a(m,n) = \sum_{i=0}^{N-1} (-1)^{q_{pi}} X_{ij(p;a)} \cos \frac{(2i+1)(m-nP)}{2N} \pi \quad (33)$$

where n is odd integer.

Further, if Formula (18) is substituted for a corresponding term in Formula (24), $S_p^b(m,n)$ can be expressed by Formulas (34) (35) as shown below.

$$S_p^b(m,n) = \sum_{i=0}^{N-1} X_{ij(p;a)} \cos \frac{(2i+1)(m+Pn)}{2N} \pi \quad (34)$$

where n is even integer.

$$S_p^b(m,n) = -\sum_{i=0}^{N-1} (-1)^{q_{pi}} X_{ij(p;a)} \cos \frac{(2i+1)(m+nP)}{2N} \pi \quad (35)$$

where n is odd integer.

Thus, if Formulas (27)–(35) are substituted for the respective corresponding terms in Formula (25), then $y_{mn}$ can be expressed by formulas (36) and (37) as shown below.

$$y_{mn} = \quad (36)$$

$$\frac{1}{2} \sum_{p=1}^{N-1} \left[ \sum_{i=0}^{N-1} (X_{ij(p;a)} + X_{ij(p;b)}) \cos \frac{(2i+1)(m+nP)}{2N} \pi + \sum_{i=0}^{N-1} (X_{ij(p;a)} + X_{ij(p;b)}) \cos \frac{(2i+1)(m-nP)}{2N} \pi \right]$$

where n is even integer.

$$y_{mn} = \frac{1}{2} \sum_{p=1,P:odd}^{N-1} \left[ \sum_{i=0}^{N-1} (X_{ij(p;a)} - X_{ij(p;b)}) \cos \frac{(2i+1)(m+nP)}{2N} \pi + \right. \quad (37)$$

-continued $$\sum_{i=0}^{N-1} (-1)^{q_p}(X_{ij(p;a)} - X_{ij(p;b)}) \cos \frac{(2i+1)(m-nP)}{2N} \pi ]$$

where n is odd integer.

However, Formulas (38) and (39) shown below correspond to one of 1-D DCT's of the input data sequence $(X_{ij(p;a)}+X_{ij(p;b)})$ for the given m and n.

$$\sum_{i=0}^{N-1} (X_{ij(p;a)} + X_{ij(p;b)}) \cos \frac{(2i+1)(m+nP)}{2N} \pi \quad (38)$$

$$\sum_{i=0}^{N-1} (X_{ij(p;a)} + X_{ij(p;b)}) \cos \frac{(2i+1)(m-nP)}{2N} \pi \quad (39)$$

That is, $f_{pl}$ which shows the result of carrying out a 1-D DCT by subjecting the re-arranged data to a first addition can be expressed by Formula (40) as shown below, and it can be seen that Formulas (38) and (39) correspond to either $+f_{pl}$ or $-f_{pl}$ for l (where l=0, 1, 2, ..., N−1).

$$f_{pl} = \sum_{i=0}^{N-1} (X_{ij(p;a)} + X_{ij(p;b)}) \cos \frac{(2i+1)l}{2N} \pi \quad (40)$$

Meanwhile, $g_{pl}$ which shows the result of carrying out a 1-D DCT by subjecting the re-arranged data (re-arranged by Formula (37)) to a first subtraction, can be expressed by formula (41) as follows.

$$g_{pl} = \sum_{i=0}^{N-1} (-1)^{q_p}(X_{ij(p;a)} - X_{ij(p;b)}) \cos \frac{(2i+1)l}{2N} \pi \quad (41)$$

In this case, it can be seen that $g_{pl}$ which is defined by Formula (41) corresponds to either $+g_{pl}$ or $-g_{pl}$ as shown by Formulas (42) and (43) below for a given l (where l=0, 1, 2, ..., N−1).

$$\sum_{i=0}^{N-1} (-1)^{q_p}(X_{ij(p;a)} - X_{ij(p;b)}) \cos \frac{(2i+1)(m+nP)}{2N} \pi \quad (42)$$

$$\sum_{i=0}^{N-1} (-1)^{q_p}(X_{ij(p;a)} - X_{ij(p;b)}) \cos \frac{(2i+1)(m-nP)}{2N} \pi \quad (43)$$

Therefore, it is noted that only $[y_{mn}:m,n=0, 1, 2, ..., N-1]$ which corresponds to N×N DCT is needed, and this implies that only N 1−D DCT's are required for the computation of N×N 2-D DCT.

Besides the $g_{pl}$ and $f_{pl}$ manipulated as above, the processes of carrying out the secondary addition and subtraction will be considered hereinafter. It can be seen that the 2-D DCT $y_{mn}$ can be expressed by the summation of $f_{pl}$ and $g_{pl}$ as evidenced by Formulas (36), (37), (40) and (41). The forms of the secondary additions for $f_{pl}$ and $g_{pl}$ for obtaining the value of $y_{mn}$ consist of butterfly stages as in the case of the DFT (discrete fourier transform) and DCT (discrete cosine transform) algorithms. In the process described above, Formula (44) as shown below will become valid where n is an even integer.

$$\cos \frac{(2i+1)[m-n(N-P)]}{2N} \pi = \pm \cos \frac{(2i+1)(m+nP)}{2N} \pi \quad (44)$$

The above formula implies that Formulas (45) and (46) become valid when the l (l=0, 1, 2, ..., N−1) is given.

$$\sum_{i=0}^{N-1} (X_{ij(p;a)} + X_{ij(p;b)}) \cos \frac{(2i+1)(m+nP)}{2N} \pi = f_{pl} \quad (45)$$

$$\sum_{i=0}^{N-1} (X_{ij(N-p;a)} + X_{ij(N-p;b)}) \cos \frac{(2i+1)(m+nP)}{2N} \pi = \pm f_{(N-p)l} \quad (46)$$

Further, from the foregoing, it can be seen that Formulas (47) and (48) will become valid where n is odd integer.

$$\sum_{i=0}^{N-1} (-1)^{q_p}(X_{ij(N;a)} - X_{ij(N;b)}) \cos \frac{(2i+1)(m+nP)}{2N} \pi = g_{pl} \quad (47)$$

$$\sum_{i=0}^{N-1} (-1)^{q_p}(X_{ij(N-p;a)} - X_{ij(N-p;b)}) \cos \frac{(2i+1)[m-n(N-P)]}{2N} \pi = \pm g_{(N-P)(N-1)} \quad (48)$$

Therefore, $f_{pl}$ which shows the result of carrying out a 1-D DCT by subjecting it to the first addition in Formulas (45) and (46) appears always together with $\pm f_{(n-p)l}$, thereby allowing to form a butterfly stage. Meanwhile, $g_{pl}$ which shows the result of carrying out 1-D DCT by subjecting it to the first subtraction in Formulas (47) and (48) appears always together with $\pm g_{(N-p)(N-1)}$, thereby allowing to form a butterfly stage.

Now the process for implementing the 2-D DCT will be described referring to FIG. 2A. First, an N×N 2-D digital data is stored into the input buffer 100 and then the re-arranging section 200 re-arranges the N×N 2-D digital data into N separate groups based on Formulas (17) and (18). Thereafter, the first adder 300 performs adding and subtracting operations in the form of a butterfly stage in order to carry out the computation of $(X_{ij(p;a)}+X_{ij(p;b)})$ and $(-1)^{q_{pi}}(X_{ij(p;a)}-X_{ij(p;b)})$ based on Formulas (40) and (41). Under this condition, the computing manner is as described below. That is, if n is even integer, an operation of adding the re-arranged data of the adjacent groups is performed, while if n is odd integer, an operation of subtracting one of the data set of the adjacent groups is performed. The data which has been subjected to the first adding and subtracting operations by the first adder 300 is supplied to the 1-D DCT where the data is subjected to a 1-D DCT. Here the output therefrom appears in the form of $f_{pl}$ showing the result of the 1-D DCT for the first added data on the one hand, and in the form of $g_{pl}$ showing the result of the 1-D DCT for the first subtracted data on the other hand.

Then, the second adder 500 performs a secondary adding operation in the form of a butterfly stage after receipt of $f_{pl}$ and $g_{pl}$ before outputting $y_{mn}$ of the 2-D DCT. The output of the second adder 500 is supplied to the output buffer 600 where the data is re-arranged into a proper form suitable as an output before outputting it to a coder.

Figure 2B:
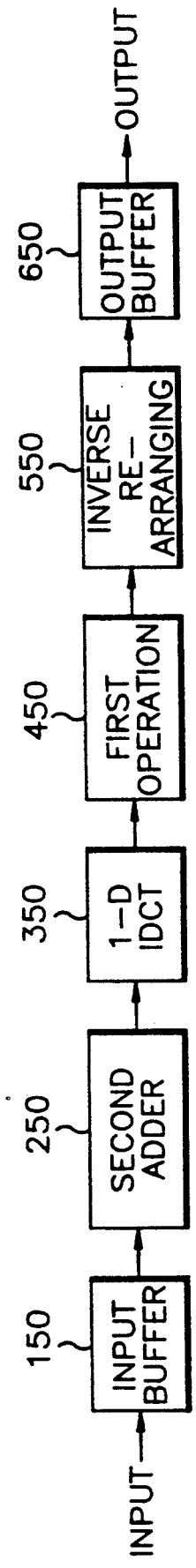

The 2-D DCT data is again inversely transformed as shown in FIG. 2B. That is, FIG. 2B illustrates the constitution of a 2-D IDCT (two-dimensional inverse discrete cosine transform), and the 2-D IDCT is carried out in a process inverse to that of the 2-D DCT.

Now the process for carrying out a 2-D DCT on an $8 \times 8$ 2-D digital data will be specifically described. First, for $N=8$, $y_{mn}$ of a 2-DCT is expressed as shown below based on Formula (5).

$$y_{mn} = \frac{1}{2}\left[\sum_{i=0}^{7}\sum_{j=0}^{7} X_{ij} \cos\frac{(2i+1)m + (2j+1)n}{16}\pi + \sum_{i=0}^{7}\sum_{j=0}^{7} \cos\frac{(2i+1)m - (2j+1)n}{16}\pi\right]$$

where $m,n = 0, 1, 2, 3, 4, 5, 6$ and $7$.

Further, $A_{mn}$ and $B_{mn}$ of Formulas (6) and (7) are also expressed as shown below.

$$A_{mn} = \sum_{i=0}^{7}\sum_{j=0}^{7} X_{ij} \cos\frac{(2i+1)m + (2j+1)n}{16}\pi$$

$$B_{mn} = \sum_{i=0}^{7}\sum_{j=0}^{7} X_{ij} \cos\frac{(2i+1)m - (2j+1)n}{16}\pi$$

In this case, if it is established that $A_{mn}$ and $B_{mn}$ shown above are the same as an 8 point DCT through the data re-arranging process, it would be possible that the 2-D DCT can be computed out from the 8 separate 1-D DCT's. Therefore, if the transform kernels for $A_{mn}$ and $B_{mn}$ are to be the same as the kernels of the 1-D transforms, $[(2i+1)m \pm (2j+1)n]$ should be expressed in a multiple of $(2i+1)$, while if this condition is to be satisfied with, $(2j+1)$ should become either a multiple of $(2i+1)$ modulo $2N$, or a multiple of $(2i+1)+N$ modulo $2N$. Therefore, if a $8 \times 8$ 2-D input data is divided into 8 groups consisting of 8 data-sets respectively based on Formulas (13) and (14), then the transforms of Formulas (6) and (7) become 8 separate 1-D DCT's. Accordingly, in the case of $N=8$, the result becomes $p=1$, 3, 5 and 7, and there are determined the values of $i$ and $j$ for dividing the $8 \times 8$ input data into 8 groups based on Formulas (13) and (14).

Accordingly, the input data [$X_{ij}$: $ij=0, 1, 2, 3, 4, 5, 6$ and 7] is divided into 8 groups as shown below based on Formulas (17) and (18).

$R_1^a = \{X_{00}, X_{11}, X_{22}, X_{33}, X_{44}, X_{55}, X_{66}, X_{77}\}$ $R_1^b = \{X_{07}, X_{16}, X_{25}, X_{34}, X_{43}, X_{52}, X_{61}, X_{70}\}$ $R_3^a = \{X_{01}, X_{14}, X_{27}, X_{32}, X_{45}, X_{50}, X_{63}, X_{76}\}$ $R_3^b = \{X_{06}, X_{13}, X_{20}, X_{35}, X_{42}, X_{57}, X_{64}, X_{71}\}$ $R_5^a = \{X_{01}, X_{17}, X_{24}, X_{31}, X_{46}, X_{53}, X_{60}, X_{75}\}$ $R_5^b = \{X_{05}, X_{10}, X_{23}, X_{36}, X_{41}, X_{54}, X_{67}, X_{72}\}$ $R_7^a = \{X_{03}, X_{12}, X_{21}, X_{30}, X_{47}, X_{56}, X_{65}, X_{74}\}$ $R_7^b = \{X_{04}, X_{15}, X_{26}, X_{37}, X_{40}, X_{51}, X_{62}, X_{73}\}$

Meanwhile the sequences $q_{pi}$ for $p = 1, 3, 5, 7$ are as follows:

$q_{1i} = \{0, 0, 0, 0, 0, 0, 0, 0\}$ $q_{3i} = \{0, 0, 0, 1, 1, 2, 2, 2\}$ $q_{5i} = \{0, 0, 1, 2, 2, 3, 4, 4\}$ $q_{7i} = \{0, 1, 2, 3, 3, 4, 5, 6\}$

Therefore, when $8 \times 8$ data input is transformed to a 2-D DCT using a 8 1-D DCT's as shown in FIG. 3A, the re-arranging section 200 re-arranges the respective 8 input data sets into 8 groups as shown in FIG. 3B in order to convert the multiplication form of the cosine function to the summation form.

Now the process for carrying out a 2-D DCT in the form of 8 separate 1-DCT's using the re-arranged data of 8 groups will be described. $A_{mn}$ and $B_{mn}$ which are shown by Formulas (19) and (20) can be expressed as shown below where $N=8$.

$$A_{mn} = [T_1^a(m,n) + T_1^b(m,n) + T_3^b(m,n) + T_5^a(m,n) + T_5^b(m,n) + T_7^a(m,n) + T_7^b(m,n)]$$

$$B_{mn} = [S_1^a(m,n) + S_1^b(m,n) + S_3^a(m,n) + S_3^b(m,n) + S_5^a(m,n) + S_5^b(m,n) + S_7^a(m,n) + S_7^b(m,n)]$$

In the foregoing, $T_p^a(m,n)$, $T_p^b(m,n)$, $S_p^a(m,n)$ and $S_p^b$ are defined in Formulas (27) and (28), (30) and (31), (32) and (33), and (34) and (35), respectively. Thus, $y_{mn}$ can be expressed as shown below based on Formulas (36) and (37).

$$y_{mn} = \frac{1}{2}\sum_{i=1}^{7}\left[\sum_{i=0}^{7}(X_{ij(p;a)} + X_{ij(p;b)})\cos\frac{(2i+1)(m+nP)}{16}\pi + \sum_{i=0}^{7}(X_{ij(p;a)} + X_{ij(p;b)})\cos\frac{(2i+1)(m-nP)}{16}\pi\right]$$

where $n$ is even and $p$ is odd integer.

$$y_{mn} = \frac{1}{2}\sum_{p=1}^{7}\left[\sum_{i=0}^{7}(-1)^{q_p}(X_{ij(p;a)} - X_{ij(p;b)})\cos\frac{(2i+1)(m+nP)}{2N}\pi + \sum_{i=0}^{7}(-1)^{q_p}(X_{ij(p;a)} - X_{ij(p;b)})\cos\frac{(2i+1)(m-nP)}{2N}\pi\right]$$

where $n$ is odd and $p$ is odd integer.
However, in the foregoing, $$\sum_{i=0}^{7}(X_{ij(p;a)} + X_{ij(p;b)})\cos\frac{(2i+1)(m+nP)}{2N}\pi$$

and $$\sum_{i=0}^{7}(X_{ij(p;a)} + X_{ij(p;b)})\cos\frac{(2i+1)(m-nP)}{2N}\pi$$

of $y_{mn}$ correspond to the 1-D DCT of the 2N data input sequence $[X_{ij(p;a)} + X_{ij(p;b)}]$ for the given $m, n$.

In the same way, $$\sum_{i=0}^{7} (-1) q_{pi}(X_{ij(p;a)} - X_{ij(p;b)}) \cos \frac{(2i+1)(m+nP)}{16} \pi$$

and $$\sum_{i=0}^{7} (-1) q_{pi}(X_{ij(p;a)} - X_{ij(p;b)}) \cos \frac{(2i+1)(m-nP)}{16} \pi$$

correspond to the 1-D DCT of the data input sequence for the given m and n, so that $q_{pi}$ can be defined in the form of Formula (41). Accordingly, $f_{pl}$ can be defined based on Formula (40). Therefore, the first adder 300 generates first summed data after implementing $(X_{ij(p;a)} + X_{ij(p;b)})$ of Formula (40), and generates first subtracted data after implementing $(-1)q_{pi}(X_{ij(p;a)} - X_{ij(p;b)})$ of Formula (41).

That is, the first adder 300 produces the first summed data and the first subtracted data by utilizing 8 re-arranged groups of data. Specifically, adders 301-304 produce first added data by adding the re-arranged data of group $R_1$ ($R_1^a$, $R_1^b$), group $R_3$ ($R_3^a$, $R_3^b$), group $R_5$ ($R_5^a$, $R_5^b$) and group $R_7$ ($R_7^a$, $R_7^b$). Meanwhile, adders 305-308 product the first subtracted data by carrying out subtractions one from the other of the re-arranged data sets of the $R_1$, $R_3$, $R_5$ and $R_7$ groups.

Upon producing the first summed and subtracted data by the first adder 300, the 1-D DCT section 400 carries out 1-D DCT's on the first summed and subtracted data based on Formulas (40) and (41) and using 8 1-D DCT's. Specifically, 1-D DCT elements 401-404 produce $f_{pl}$ data after receipt of the first summed data from the adders 301-304, while 1-D DCT elements 405-408 produce $g_{pl}$ data after receipt of the first subtracted data from the adders 305-308. Therefore, if the 8×8 DCT sequence $y_{mn}$ is to be computed, only $f_{pl}$ and $g_{pl}$ are needed and thus it can be seen that only 8 1-D DCT's are required for computing 8×8 DCT.

As described above, $y_{mn}$ is produced in the form of the summation of $f_{pl}$ and $g_{pl}$, and, in this connection, the definitions of $y_{mn}$ for a predetermined m and n will be presented below in order to see the relation between $y_{mn}$ and $f_{pl}$ and $g_{pl}$.

$y_{30} = \frac{1}{4}(f_{13} + f_{13} + f_{33} + f_{33} + f_{53} + f_{53} + f_{73} + f_{73})$ $y_{52} = \frac{1}{4}(f_{17} + f_{13} - f_{35} + f_{31} - f_{51} + f_{55} - f_{73} - f_{77})$ $y_{34} = \frac{1}{4}(f_{17} + f_{11} - f_{31} - f_{37} - f_{57} - f_{51} + f_{71} + f_{77})$ $y_{26} = \frac{1}{4}(O + f_{14} - f_{34} - f_{30} + f_{50} + f_{54} - f_{74} + O)$ $y_{41} = \frac{1}{4}(g_{15} + g_{13} + g_{37} + g_{31} - g_{57} + g_{51} - g_{75} + g_{73})$ $y_{03} = \frac{1}{4}(g_{13} + g_{13} - g_{37} - g_{37} - g_{51} - g_{51} - g_{75} - g_{75})$ $y_{35} = \frac{1}{4}(O + g_{12} - g_{32} - g_{34} + g_{54} - g_{56} + g_{76} + g_{70})$ $y_{57} = \frac{1}{4}(-g_{14} + g_{12}g_{35} - g_{30} + O + g_{52} - g_{76} - g_{74})$ In this case, if n is an even integer, $f_{pl}$ appears always together with $\pm f_{(N-pl)}$ in Formulas (45) and (46), thereby making it possible to form a butterfly stage. Meanwhile, if n is odd integer, $g_{pl}$ appears always together with $\pm g_{(N-pl)}$ in Formulas (47) and (48), thereby making it possible to form a butterfly stage.

Accordingly, when N=8, the above instances can be expressed as shown below.

$y_{30} = \frac{1}{4}\{(f_{13} + f_{73}) + (f_{13} + f_{73}) + (f_{33} + f_{53}) + (f_{33} + f_{53})\}$ $y_{52} = \frac{1}{4}\{(f_{17} - f_{77}) + (f_{13} - f_{73}) - (f_{35} + f_{55}) + (f_{31} - f_{51})\}$ $y_{34} = \frac{1}{4}\{(f_{17} + f_{77}) + (f_{11} + f_{71}) - (f_{31} + f_{51}) - (f_{31} + f_{51})\}$ $y_{26} = \frac{1}{4}\{(O + O) + (f_{14} - f_{74}) - (f_{34} - f_{54}) - (f_{30} + f_{50})\}$ $y_{41} = \frac{1}{4}\{(g_{15} + g_{73}) + (g_{13} - g_{75}) + (g_{37} + g_{51}) + (g_{31} - g_{57})\}$ $y_{03} = \frac{1}{4}\{(g_{13} - g_{75}) + g_{13} - g_{75}) - (g_{37} + g_{51}) - (g_{37} + g_{51})\}$ $y_{35} = \frac{1}{4}\{(O + g_{70}) + (g_{12} + g_{76}) - (g_{32} + g_{56}) - (g_{34} - g_{54})\}$ $y_{57} = \frac{1}{4}\{-(g_{14} + g_{74}) + g_{12} - g_{76}) + (g_{36} + g_{52}) - (g_{30}O)\}$ In this context, the operations of the secondary adder 500 will be discussed by taking $Y_{30} = \frac{1}{4}[(f_{13} + f_{73}) + (f_{13} + f_{73}) + (f_{33} + f_{53}) + (f_{33} + f_{53})]$ as an instance. $(f_{13} + f_{73})$, $(f_{13} + f_{73})$, $(f_{33} + f_{53})$ and $(f_{33} + f_{53})$ are implemented by the adder 501, $(f_{13} + f_{73}) + (f_{13} + f_{73})$ and $(f_{33} + f_{53}) + (f_{33} + f_{53})$ are implemented by the adder 502, and $[(f_{13} + f_{73}) + (f_{13} + f_{73})] + [(f_{33} + f_{53}) + (f_{33} + f_{53})]$ is implemented by the adder 503, while "$\frac{1}{4}$" is implemented by the shifter 504.

Now the constitution of FIGS. 4A-4C will be described. That is, as shown in FIG. 4A, the first adder 300 generates the first summed data and first subtracted data in order to supply the re-arranged data $X_{ij}$ to the 1-D DCT section 400. In turn, the 1-D DCT section 400 generates $f_{pl}$ and $g_{pl}$ by carrying out the 1-D DCT on the first summed and subtracted data.

Meanwhile, the second adder 500 as shown in FIG. 4B is for computing $y_{mn}$ (with n being even integer) from $f_{pl}$ generated by the 1-D DCT section 400, while the second adder 500 as shown in FIG. 4C is for computing $y_{mn}$ (with n being odd integer) from $g_{pl}$. The number of the summations performed by the second adder 500 is determined by $\log_2 N$ stage, while in the case of N=8 as shown in FIGS. 4B and 4C, the number of additions is 3 stages ($\log_2 8$). Further, the multiplication by $\frac{1}{4}$ performed by the second adder 500 is carried out in the same form as that of the shifting operation and therefore, the actual multiplications are carried out by the 1-D DCT section 400.

The implementation of the 2-D DCT is described above, and now the operation of the inverse transform will be described referring to FIGS. 5A-5C.

Generally, in the algorithm of a fast transform, the flow of an inverse transform can be computed by taking a flow inverse to the forward flow, if the scale factor is not taken into account. However, in the case where the scale factor is taken into account, the inverse transform has to be carried out after adding a slight modification. That is, as shown in FIGS. 4A-4C, there are some nodes which do not have their pairs, thereby making it impossible for the second adder 500 to form a butterfly stage when implementing the 2-D DCT.

Accordingly, if the signals are to flow in an inverse manner when carrying out the 2-D IDCT, it has only to be made sure that a first 1-D IDCT section 350 which performs computations inversely to that of the second adder 500 should take a double of the value of the relevant node so as for the value of the inverse transform not to be varied. That is, it is seen that there are no pairs for the two nodes existing between the lines $f_{50}$ and $f_{70}$ in the second adder 500. Therefore, when carrying out the 2-D IDCT, if the first 1-D IDCT section 350 takes a double of the line value, a correct result can be obtained. Further, a first operation section 450 has to multiply the 0th input by ½, when the scale factor is taken into account, and this is solved by the shifting operation. However, when carrying out the 1-D IDCT for $g_{p1}$, the above multiplying factor ½ and the multiplying factor 2 for the node can be offset each other in the first operation section 450.

In the case where the scale factors for $X_{ij}$ are to be kept in the original form, the values of the nodes have to be multiplied by ½, or the input $y_{mn}$ has to be divided by $N^2/2$. However, considering the fact that the computations are concerned with a limited number of bits, it is more advantageous to adopt the multiplication by ½.

Furthermore, when implementing the 2-D DCT by means of a high density circuit, the most important factor is to reduce the number of the multiplications, because the multipliers occupy a large area in the integrated circuit. In the case where the 2-D DCT is carried out using the method of FIGS. 3A–3B, the N 1-D DCT's are required and therefore, if N×N DCT's are in parallel performed, a structure of N 1-D DCT's is required.

Figure 7A:
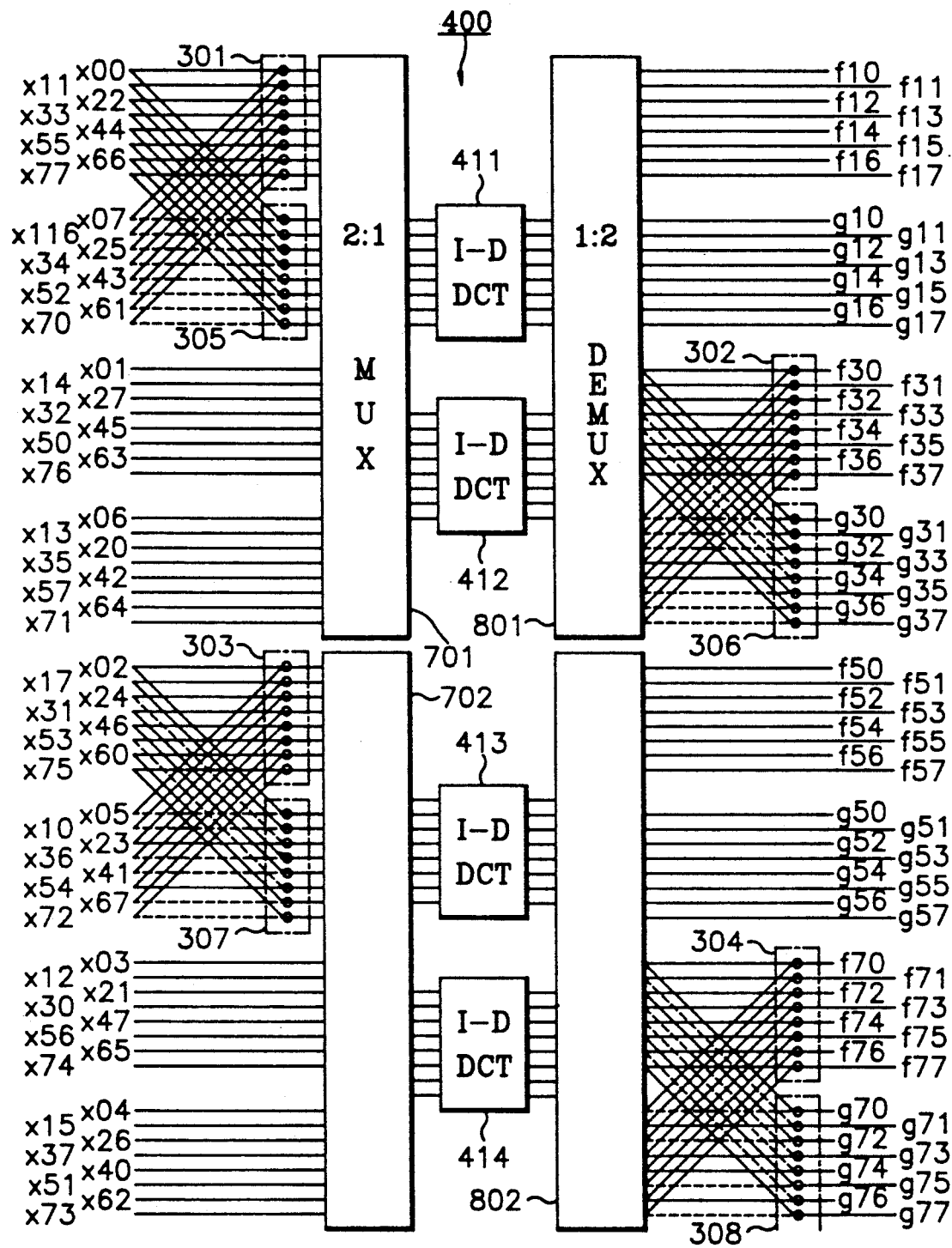
FIGS. 7A, 7B, 7C illustrate another embodiment of an 8×8 2-D DCT circuit according to the present invention.
Figure 7B:
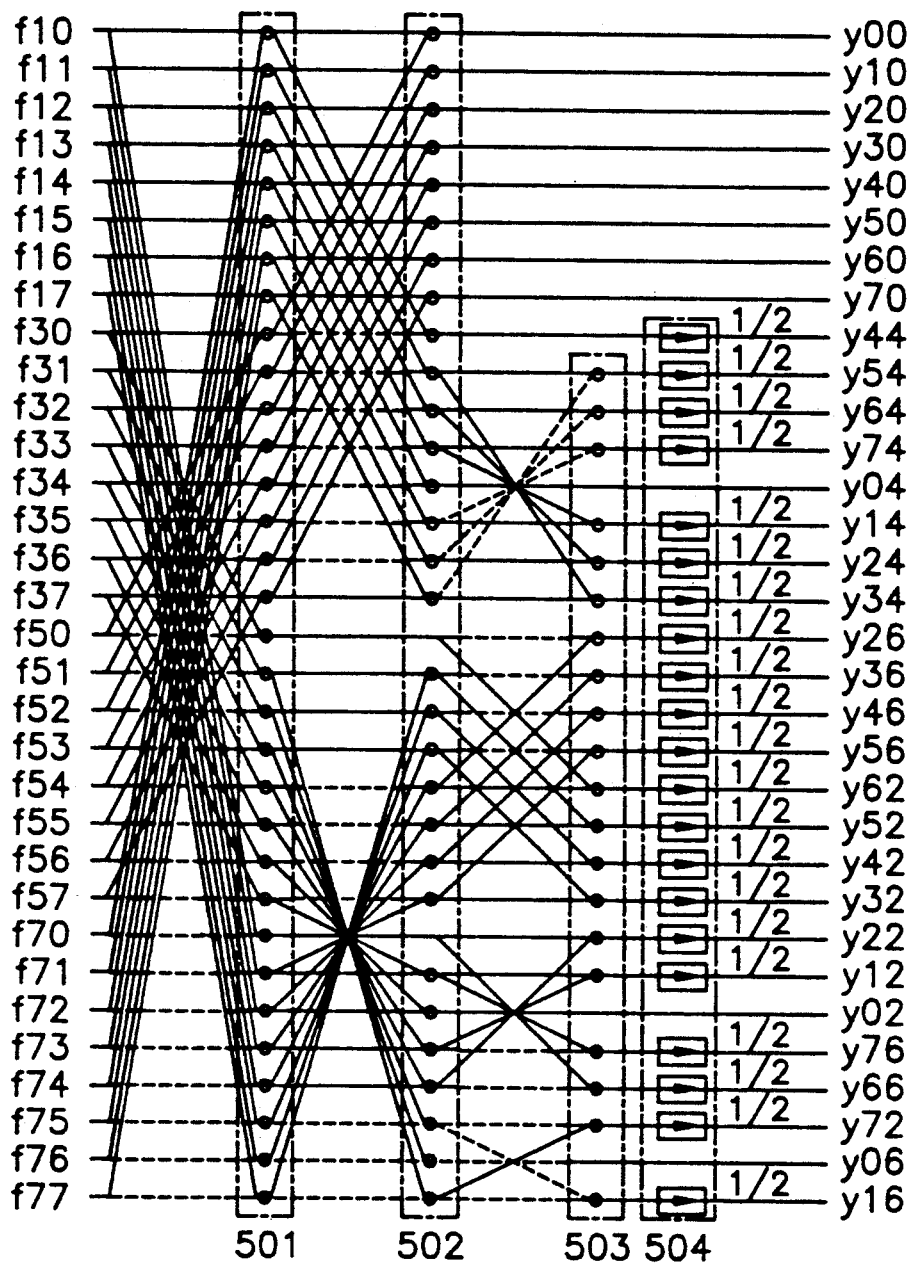
Figure 7C:
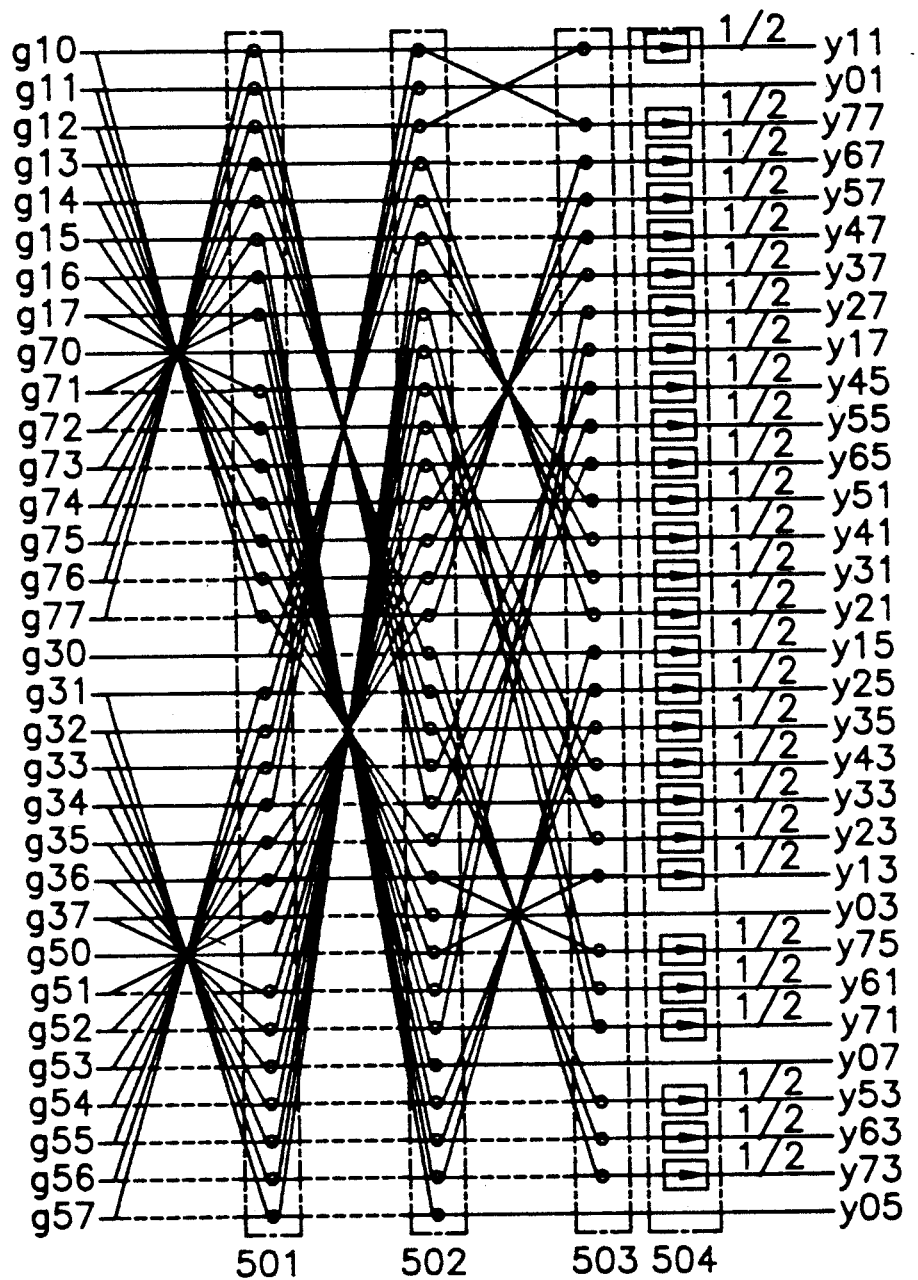

FIGS. 7A–7C illustrate the method of implementing N/2 1-D DCT's using a multiplexer 700 and demultiplexer 800, for the case where a parallel implementation of N×N DCT's is structurally provided. As shown in FIG. 3A, the first adder 300 generates a first summed data and first subtracted data by computing the re-arranged data for the respective group units, while the 1-D DCT section 400 carries out 1-D DCT on the outputs of the first adding section 300 to generate $f_{p1}$ and $f_{g1}$. However, as shown in FIG. 6, the 1-D DCT's are first carried out on the re-arranged group data by the 1-D DCT section 400, and then, the result of the implementation of the 1-D DCT's is processed by the first adding section 300, thereby generating $f_{p1}$ and $g_{p1}$.

That is, during the time when the re-arranged data of $R_1^a$ and $R_1^b$ groups are processed by the adders 301, 302, 1-D DCT's are performed on the re-arranged data of $R_3^a$ and $R_3^b$ groups by the 1-D DCT elements 403, 404. Thereafter, the same results of $f_{p1}$ and $g_{p1}$ can be obtained even if the first summed data and first subtracted data of the $R_1^a$ and $R_1^b$ groups generated from the adders 301, 302 and the 1-D DCT data of the $R_3^a$ and $R_3^b$ groups generated from the 1-D DCT elements 403, 404 are processed by the adders 303, 304. That is, as shown in FIG. 6, even if the order of the implementations of the first addition and the 1-D DCT for the re-arranged data of the $R_3^a$ and $R_3^b$ groups and the re-arranged data of the $R_7^a$ and $R_7^b$ groups are reversed, the values of $F_{p1}$ and $g_{p1}$ thus obtained become the same.

Accordingly, as shown in FIG. 7A–7C, during the time when the adders 311, 315 process the re-arranged data of the $R_1^a$ and $R_1^b$ groups, the multiplexer 701 selects the re-arranged data of the $R_3^a$ and $R_3^b$ groups to generate them to the 1-D DCT elements 411, 412.

Meanwhile, the multiplexer 702 selects the re-arranged data of the $R_7^a$ and $R_7^b$ groups to supply them to the 1-D DCT elements 413, 414, during the time when the adders 313, 317 process the re-arranged data of the $R_5^a$ and $R_3^b$ groups.

Then, during the time when the re-arranged data of the $R_1^a$ and $R_1^b$ groups and the re-arranged data of the $R_5^a$ and $R_5^b$ groups are processed by the first adding section 300, the 1-D DCT section 400 carries out 1-D DCT's on the re-arranged data of the $R_3^a$ and $R_3^b$ groups and the re-arranged data of the $R_7^a$ and $RR_7^b$ groups.

Thereafter, the multiplexers 701, 702 respectively select the outputs of the adders 311, 315 and the adders 313, 317 and at the same time the demultiplexers 801, 802 respectively select the outputs of the 1-D DCT elements 411, 412, 413, 414 to output them to the adders 312, 316 and 314, 318. Therefore, during the time when the data of the $R_1^a$ and $R_1^b$ groups and the $R_5^a$ and $R_3^b$ groups are subject to the implementations of 1-D DCT by the 1-D DCT section 400, the data of the $R_3^a$ and $R_3^b$ are processed by the first adder 300. Thereafter, the results are supplied to the second adder 500 where the data are subject to the implementations of summations and subtractions in the form of $\log_2 N$ butterfly stages.

According to the present invention described above, when implementing the 2-D DCT on a N×N 2-dimensional data input, it can be carried out by performing N separate 1-D DCT's and by performing first and secondary summations in the form of a butterfly stages. Furthermore, in forming the parallel constitution of the hardware using multiplexers and demultiplexers, only N/2 1-D DCT's are required and therefore, the number of the multiplications can be greatly reduced, thereby making it possible to realize a fast 2-D DCT and a high density circuit.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method for conducting a discrete cosine transform on N×N two-dimensional input data, said method comprising:

re-arranging the N×N input data received as input electrical signals to enable the input data to be identical to kernels of a one-dimensional discrete cosine transform of a cosine function to transform a multiplying form of said cosine function, said multiplying form being kernels of a two-dimensional discrete cosine transform, into a summation form;

generating first N/2 summed data by adding together even groups and odd groups in the re-arranged data, and generating first N/2 subtracted data by calculating differences between the even groups and the odd groups;

performing one-dimensional discrete cosine transforms on said first summed data and said first subtracted data to generate one-dimensional discrete cosine transform data; and generating output electrical signals representing two-dimensional cosine transform data by performing summations and subtractions on said one-dimensional cosine transform data in $\log_2 N$ butterfly stages, and then by carrying out a shifting on a result of said summations and subtractions.

2. A device for calculating discrete cosine transforms on N×N two-dimensional input data, comprising:

means for re-arranging the N×N input data represented by input electrical signals, to render the input data identical to kernels of one-dimensional discrete cosine transform of a cosine function to transform a multiplying form of said cosine function, said multiplying form being kernels of a two-dimensional discrete cosine transform, into a summation form;

means for generating N/2 summed data groups by adding together even groups and odd groups in the re-arranged data, and generating N/2 subtracted a data groups by calculating a difference between said even groups and said odd groups;

means for carrying out one-dimensional discrete cosine transforms on said summed data groups and said subtracted data groups to generate one-dimensional discrete cosine transform data; and means coupled to the one-dimensional discrete cosine transform means, for generating output electrical signals representing two-dimensional discrete cosine transform data by performing summations and subtractions on said one-dimensional discrete cosine transform data in $\log_2 N$ butterfly stages, and then for shifting results of said summation and subtraction by multiplying by $\frac{1}{4}$.

3. The device for calculating discrete cosine transforms in claim 2, wherein the one-dimensional discrete cosine transform means comprises N one-dimensional discrete cosine transform circuits connected in parallel.

4. The device for calculating discrete cosine transforms in claim 2, wherein the one-dimensional discrete cosine transform means comprises N/2 one-dimensional discrete cosine transform circuits connected in parallel each comprising a multiplier, a multiplexer and a demultiplexer.

5. A method for conducting discrete cosine transform on $N \times N$ two-dimensional input data, said method comprising:

receiving input electrical signals representing $N \times N$ two-dimensional input data.;

rearranging said $N \times N$ two-dimensional input data into N groups of rearranged data;

generating N/2 summed data groups by adding together even groups and odd groups of said groups of rearranged data, and generating N/2 subtracted data groups by calculating differences between even groups and odd groups of said groups of rearranged data;

performing one dimensional discrete cosine transformation on said N/2 summed data groups and said N/2 subtracted data groups to generate one dimensional discrete cosine transform data;

generating output electrical signals representing two-dimensional discrete cosine transform data by performing summations and subtractions on said one-dimensional discrete cosine transform data in $\log_2 N$ butterfly stages, and then by carrying out a shifting on a result of said summations and subtractions.

6. A method for conducting discrete cosine transforms as in claim 5, wherein said $N \times N$ two-dimensional input data is rearranged into said N groups of rearranged data based on the formulas:

$$R_p^a = X_{ij(p;a)}; i = 0, 1, 2, \ldots, N-1;$$
$$j(p;a) = p \cdot i + ((p-1)/2) N q_{pi}; \text{ and}$$

$$R_p^b = X_{ij(p;b)}; i = 0, 1, 2, \ldots, N-1;$$
$$j(p;b) = N - 1 - p \cdot i + ((p-1)/2) + N q_{pi};$$

in which $p = 1, 3, 5, \ldots N-1$; $R_p^a$ and $R_p^b$ represent groups of data $q_{pi}$ is an integer sequence, and $X_{ij}$ represents said $N \times N$ two dimensional input data.

7. A method for conducting discrete cosine transforms as in claim 6, wherein said N/2 summed data groups are generated by adding together $X_{ij(p;a)}$ and $X_{ij(p;b)}$.

8. A method for conducting discrete cosine transforms as in claim 7, wherein said N/2 subtracted data groups are generated by the formula: $(-1) N q_{pi} (X_{ij(p;a)} - X_{ij(p;b)})$.

9. A method for conducting discrete cosine transforms as in claim 6, wherein said one dimensional transform data is calculated from said N/2 summed data groups and said N/2 subtracted data groups based on the formulas:

$$f_{pl} = \sum_{i=0}^{N-1} (X_{ij(p;a)} + X_{ij(p;b)}) \cos(((2i + 1)l\pi)/2N)$$

$$g_{pl} = \sum_{i=0}^{N-1} (-1)^{q_{pi}} (X_{ij(p;a)} - X_{ij(p;b)}) \cos(((2i + 1)l\pi)/2N)$$

in which $l = (1, 1, \ldots 7)$.

10. A method for conducting discrete cosine transforms on $8 \times 8$ two-dimensional input data, said method comprising:

receiving input electrical signals representing said $8 \times 8$ two-dimensional input data;

rearranging said $8 \times 8$ two-dimensional input data into eight groups of rearranged data;

generating four summed data groups by adding together said eight groups of rearranged data and generating four subtracted data groups by calculating a difference between said eight groups of rearranged data;

performing one dimensional discrete cosine transformation on said four summed data groups and said four subtracted data groups to generate one dimensional discrete cosine transform data;

generating output electrical signals representing two-dimensional discrete cosine transform data by performing summations and subtractions on said one-dimensional discrete cosine transform data in three butterfly stages, and then by carrying out a shifting on a result of said summations and subtractions.

11. A method for conducting discrete cosine transforms as in claim 10, wherein $X_{ij}$ represents said $8 \times 8$ two dimensional input data and said eight groups of rearranged data are:

$R_1^a = \{X_{00}, X_{11}, X_{22}, X_{33}, X_{44}, X_{55}, X_{66}, X_{77}\}$ $R_1^b = \{X_{07}, X_{16}, X_{25}, X_{34}, X_{43}, X_{52}, X_{61}, X_{70}\}$ $R_3^a = \{X_{01}, X_{14}, X_{27}, X_{32}, X_{43}, X_{50}, X_{63}, X_{76}\}$ $R_3^b = \{X_{06}, X_{13}, X_{20}, X_{35}, X_{42}, X_{57pl}, X_{64}, X_{71}\}$ $R_5^a = \{X_{02}, X_{17}, X_{24}, X_{31}, X_{46}, X_{53}, X_{60}, X_{75}\}$ $R_5^b = \{X_{05}, X_{10}, X_{23}, X_{36}, X_{41}, X_{54}, X_{67}, X_{72}\}$ $R_7^a = \{X_{03}, X_{12}, X_{21}, X_{30}, X_{47}, X_{56}, X_{65}, X_{74}\}$ $R_7^b = \{X_{04}, X_{15}, X_{26}, X_{37}, X_{40}, X_{51}, X_{62}, X_{73}\}$.

12. A method for conducting discrete cosine transforms as in claim 11, wherein four summed data groups are generated by adding $R_1^a$ to $R_1^b$, $R_3^a$ to $R_3^b$, $R_5^a$ to $R_5^b$, and $R_7^a$ to $R_7^b$, and said four subtracted data groups by calculating a difference between $R_1^a$ and $R_1^b$, $R_3^a$ and $R_3^b$, $R_5^a$ and $R_5^b$, and $R_7^a$ and $R_7^b$.

13. A method for conducting discrete cosine transforms as in claim 12, wherein said one dimensional transform data is calculated from said four summed data groups and said four subtracted data groups based on the formulas:

$$f_{pl} = \sum_{i=0}^{7} (X_{ij(p;a)} + X_{ij(p;b)}) \cos(((2i + 1)l\pi)/16)$$

$$g_{pl} = \sum_{i=0}^{7} (-1)^{q_{pl}}(X_{ij(p;a)} - X_{ij(p;b)}) \cos(((2i + 1)l\pi)/16)$$

in which l=(0, 1, ... 7).

14. A method for conducting discrete cosine transforms as in claim 13, wherein said two dimensional transform data, $y_{mn}$, is calculated from said one dimensional transform data based on the formulas:

$y_{30} = \frac{1}{4}\{(f_{13}+f_{73})+(f_{13}+f_{73})+(f_{33}+f_{53})+(f_{33}+f_{53})\}$ $y_{52} = \frac{1}{4}\{(f_{17}+f_{77})+(f_{13}-f_{73})-(f_{35}+f_{55})+(f_{31}-f_{51})\}$ $y_{34} = \frac{1}{4}\{(f_{17}+f_{77})+(f_{11}+f_{71})-(f_{31}+f_{51})-(f_{31}+f_{51})\}$ $y_{26} = \frac{1}{4}\{(0+0)+f_{14}-f_{74})-(f_{34}-f_{54})-(f_{30}+f_{50})\}$ $y_{41} = \frac{1}{4}\{(g_{15}+g_{73})+(g_{13}-g_{75})+(g_{37}+g_{51})+(g_{31}-g_{57})\}$ $y_{03} = \frac{1}{4}\{(g_{13}-g_{75})+(g_{13}-g_{75})-(g_{37}+g_{51})-(g_{37}g_{51})\}$ $y_{35} = \frac{1}{4}\{0+g_{70})+(g_{12}+g_{76})-(g_{32}+g_{56})-(g_{34}-g_{54})\}$ $y_{57} = \frac{1}{4}\{-(g_{14}+g_{74})+(g_{12}-g_{76})+(g_{36}+g_{52})-(g_{30}+0)\}$.

15. A device for calculating discrete cosine transforms on two-dimensional input data, said device comprising:
means for re-arranging said two-dimensional input data into a first plurality of one-dimensional input data groups and a second plurality of one-dimensional input data groups;
a plurality of parallel adders of calculating a plurality of summation data groups by adding together corresponding groups of said first plurality of one-dimensional input data groups with said second plurality of one-dimensional input data groups;
a plurality of parallel subtractors for calculating a plurality of subtraction data groups by calculating differences between said corresponding groups of said first plurality of one-dimensional input data groups with said second plurality of one-dimensional input data groups;
a plurality of parallel one-dimensional discrete cosine transform circuits for calculating one-dimensional discrete cosine transforms of said plurality of summation data groups and said plurality of subtraction data groups to generate a first plurality of transformed data groups and a second plurality of transformed data groups, respectively;
a first plurality of adding and shifting circuits for adding together and shifting said first plurality of transformed data groups to generate a first portion of two-dimensional transformed data; and
a second plurality of adding and shifting circuits for adding together and shifting said second plurality of transformed data groups to generate a second portion of said two-dimensional transformed data.

16. A device as claimed in claim 15, wherein said two-dimensional input data $(X_{ij}; i,j=0, 1, 2, \ldots N-1)$ is rearranged into said first plurality of one-dimensional input data groups, $R_p^a$, and said second plurality of one-dimensional input data groups, $R_p^b$, by said means for re-arranging according to the formulae:

$R_p^a = X_{ij(p;a)}; i=0, 1, 2, \ldots N-1;$
$j(p;a) = (pi+(p+(p-1)/2)$ modulo $N$, and $R_p^b = X_{ij(p;b)}; i=0, 1, 2, \ldots N-1;$
$j(p;b) = (N-1-pi+(p-1)/2)$ modulo $N$;

in which p=1, 3, 5, ... N−1.

17. A circuit for calculating two-dimensional discrete cosine transformation, said circuit comprising:
a first sub-circuit for rearranging received two-dimensional data into a plurality of rearranged data groups;
a second sub-circuit for performing one-dimensional discrete cosine transform on each of said rearranged data groups and for adding and subtracting said rearranged data groups to and from each other, to generate one-dimensional discrete cosine transform data; and
a third sub-circuit for generating two-dimensional discrete cosine transform data by performing summations and subtractions on said one-dimensional discrete cosine transform data.

18. A device as claimed in claim 17, wherein said two-dimensional data $(X_{ij}; i,j=0, 1, 2, \ldots N-1)$ is rearranged into said plurality of rearranged data groups $(R_p^a, R_p^b: p=1, 3, 5, \ldots N-1)$ by said first sub-circuit according to the formulae:

$R_p^a = X_{ij(p;a)}; i=0, 1, 2, \ldots N-1;$
$j(p;a) = (pi+(p-1)/2)$ modulo N, and $R_p^b = X_{ij(p;b)}; i=0, 1, 2, \ldots N-1;$
$j(p;b) = (N-1-pi+(p-1)/2)$ modulo N;

in which p=1, 3, 5, ... N−1.

19. A device as claimed in claim 18, wherein said second sub-circuit comprises:
a butterfly stage for adding the $R_p^a$ ones of said rearranged data groups to the $R_p^b$ ones of said rearranged data groups to generate addition data groups, and for calculating differences between the $R_p^a$ ones of said rearranged data groups and the $R_p^b$ ones of said rearranged data groups to generate subtraction data groups; and
one-dimensional discrete cosine transform circuits for independently calculating one-dimensional discrete cosine transforms of each of said subtraction data groups and said addition data groups to generate said one-dimensional discrete cosine transform data.

20. A device as claimed in claim 17, wherein said second sub-circuit comprises:
a butterfly stage for adding and subtracting predetermined ones of said rearranged data groups to and from each other to generate subtraction data groups and addition data groups, respectively; and
one-dimensional discrete cosine transform circuits for independently calculating one-dimensional discrete cosine transforms of each of said subtraction data groups and said addition data groups to generate said one-dimensional discrete cosine transform data.

21. A device as claimed in claim 17, wherein said second sub-circuit comprises:
   one-dimensional discrete cosine transform circuits for independently calculating one-dimensional discrete cosine transforms of each of said rearranged data groups to generate intermediate data groups; and
   a butterfly stage for adding and subtracting predetermined ones of said intermediate data groups to and from each other to generate said one-dimensional discrete cosine transform data.

22. A method for conducting a discrete cosine transform on N×N two-dimensional input data, said method comprising:
   re-arranging the N×N input data in a rearranging circuit to enable the input data to be identical to kernels of a one-dimensional discrete cosine transform of a cosine function to transform a multiplying form of said cosine function, said multiplying form being kernels of a two-dimensional discrete cosine transform, into a summation form;
   adding together even groups and odd groups in adder circuits, calculating differences between even groups and odd groups in subtracting circuits, and carrying out one-dimensional discrete cosine transforms, in one-dimensional discrete cosine transform calculating circuits, to generate one-dimensional discrete cosine transform data from the rearranged input data; and
   generating two-dimensional discrete cosine transform data by performing summations and subtractions on said one-dimensional discrete cosine transform data in $\log_2 N$ butterfly stages of adder and subtracting circuits.

23. A method for conducting discrete cosine transform on N×N two-dimensional input data, said method comprising:
   receiving input electrical signals representing N×N (two-dimensional input data;
   rearranging said N×N two-dimensional input data into N groups of rearranged data in rearranging circuits;
   adding together even groups and odd groups in adder circuits, calculating differences between even groups and odd groups in subtracting circuits, and performing one dimensional discrete cosine transformation to generate one-dimensional discrete cosine transform data in one dimensional discrete cosine transformation circuits in response to said N groups of rearranged data;
   generating output electrical signals representing two-dimensional discrete cosine transform data by performing summations and subtractions on said one-dimensional discrete cosine transform data in $\log_2 N$ butterfly stages of adding and subtracting circuits.

24. A circuit for calculating two-dimensional discrete cosine transformation, said circuit comprising:
   a first sub-circuit for rearranging received two-dimensional data into a plurality rearranged data groups, each of said rearranged data groups comprising a first data group and a second data group;
   a plurality of parallel transmission paths, each of said transmission paths receiving a different one of said rearranged data groups and comprising a cascade connected adding and subtracting circuit and a one dimensional discrete cosine transform circuit to perform additions and subtractions and one dimensional discrete cosine transforms on the received rearranged data groups to generate one-dimensional discrete cosine transform data; and
   a second sub-circuit for generating two-dimensional discrete cosine transform data by performing summations and subtractions on said one-dimensional discrete cosine transform 25. A circuit as claimed in claim 24, wherein said adding and subtracting circuit of each of one said parallel transmission paths adds and subtracts said first data group and said second data group of the received one of said rearranged data groups.

* * * * *

UNITED STATES PATENT AND TRADEMARK OFFICE
CERTIFICATE OF CORRECTION

PATENT NO. : 5,257,213
DATED : October 26, 1993
INVENTOR(S) : Gye-Jong Kim; et al.

It is certified that error appears in the above-indentified patent and that said Letters Patent is hereby corrected as shown below:

IN THE CLAIMS

| | | |
|---|---|---|
| Column 18, | Line 57, | After "dimensional", Insert --discrete-- ; |
| | Line 59, | After "dimensional", Insert --discrete-- ; |
| Column 19, | Line 6, | After "subtracted", Delete "a" ; |
| | Line 30, | After "demultiplexer", Change the comma "," to a period --.-- ; |
| Column 20, | Line 6, | Change "-$X_{ij(p;b)}$" to -- -$X_{ij(p;b)})$-- ; |
| | Line 52, | Change "$X_{43}$" to --$X_{45}$-- ; |
| | Line 54, | Change "$X_{57p1}$" to --$X_{57}$-- ; |
| Column 21, | Line 32, | Change "-(g37g51" to --(g37+g51-- ; |

UNITED STATES PATENT AND TRADEMARK OFFICE
CERTIFICATE OF CORRECTION

PATENT NO. : 5,257,213
DATED : October 26, 1993
INVENTOR(S) : Gye-Jong Kim, et al It is certified that error appears in the above-indentified patent and that said Letters Patent is hereby corrected as shown below:

Column 23, Line 42,   Change "(two-" to --two- --.

Signed and Sealed this

Twenty-seventh Day of September, 1994

Attest:

BRUCE LEHMAN

*Attesting Officer*    *Commissioner of Patents and Trademarks*